US009618263B2

(12) United States Patent
Hogan

(10) Patent No.: US 9,618,263 B2
(45) Date of Patent: Apr. 11, 2017

(54) NON-THERMAL DRYING SYSTEMS WITH VACUUM THROTTLE FLASH GENERATORS AND PROCESSING VESSELS

(71) Applicant: Flash Rockwell Technologies, LLC, Salt Lake City, UT (US)

(72) Inventor: John Hogan, Bountiful, UT (US)

(73) Assignee: Flash Rockwell Technologies, LLC, Bountiful, UT (US)

( * ) Notice: Subject to any disclaimer, the term of this patent is extended or adjusted under 35 U.S.C. 154(b) by 367 days.

(21) Appl. No.: 14/105,753

(22) Filed: Dec. 13, 2013

(65) Prior Publication Data
US 2014/0215842 A1    Aug. 7, 2014

Related U.S. Application Data

(60) Provisional application No. 61/737,154, filed on Dec. 14, 2012, provisional application No. 61/900,615, filed on Nov. 6, 2013.

(51) Int. Cl.
| F26B 19/00 | (2006.01) |
| F26B 21/00 | (2006.01) |
| F26B 5/04  | (2006.01) |

(52) U.S. Cl.
CPC ............ *F26B 21/004* (2013.01); *F26B 5/041* (2013.01)

(58) Field of Classification Search
CPC .......... F26B 17/10; F26B 17/101; F26B 3/10; B01D 1/18; B01D 1/20; B01F 2005/0448;
(Continued)

(56) References Cited

U.S. PATENT DOCUMENTS 2,020,850 A * 11/1935 Marquis ................ B01F 3/0473
106/420
2,054,441 A * 9/1936 Peebles ................. F26B 17/101
159/4.06
(Continued)

FOREIGN PATENT DOCUMENTS

DE    1 037 374    8/1958
FR    1 017 406    12/1952
(Continued)

OTHER PUBLICATIONS

International Preliminary Report on Patentability—PCT/US2011/058759, May 7, 2013, Flash Rockwell Technologies, LLC.
(Continued)

*Primary Examiner* — Kenneth Rinehart
*Assistant Examiner* — Jason Lau
(74) *Attorney, Agent, or Firm* — Womble Carlyle Sandridge & Rice LLP

(57) ABSTRACT

A system is disclosed for drying a material to liberate a substance such as a liquid having a vapor pressure from solids and/or dissolved substances in the material. The system includes a plenum chamber and a blower providing a stream of air to the plenum chamber. An outlet communicates with the plenum chamber and a velocity accelerator is disposed downstream of the outlet. The velocity accelerator is arranged to receive air from the outlet of the plenum chamber into a progressively narrowing interior passageway terminating at a downstream choke point orifice. The choke point orifice discharges into a larger diameter discharge region. A throttle body is disposed in the discharge region and is selectively movable toward and away from the choke point orifice to decrease or increase the volume of the discharge region. A passageway is formed through the throttle body for receiving flashed material from the discharge region and conveying the material in a downstream
(Continued)

direction. Also disclosed is a system for drying materials contained within a processing vessel wherein flash generators with vacuum throttles are used to maintain drying conditions within the vessel and to remove liberated substance from the processing vessel.

20 Claims, 14 Drawing Sheets

(58) Field of Classification Search
CPC ............ B01F 3/04021; B01F 3/04063; B01F 3/04056; B01F 2003/04872; B01F 2003/0896; B01F 3/04099; B01F 3/04446; B01F 3/0473; B01F 3/0876; B01F 5/0413; B01F 5/0463; B01F 5/0498; B01F 5/0646; B01F 5/0655; A61M 2202/064; A61M 11/02; A61M 11/06; A61M 16/127; A61M 2205/3334
USPC .............................. 261/78.1; 222/71; 34/92
See application file for complete search history.

(56) References Cited

U.S. PATENT DOCUMENTS

| | | | | |
|---|---|---|---|---|
| 2,310,265 A * | 2/1943 | Sweeny | ................ | B01F 5/0426 406/194 |
| 2,421,902 A * | 6/1947 | Neuschotz | .......... | C03B 19/1085 252/378 P |
| 2,520,566 A * | 8/1950 | Sargrove | ................... | B24C 3/12 192/116.5 |
| 2,615,906 A | 10/1952 | Stanton | | |
| 2,695,265 A * | 11/1954 | Degnen | ................. | B01F 5/0413 137/889 |
| 2,783,544 A * | 3/1957 | Bachmann | ............ | F26B 17/103 34/364 |
| 3,456,357 A | 7/1969 | Griffith | | |
| 3,508,339 A * | 4/1970 | Debacher | ................. | B01D 1/18 34/368 |
| 3,600,818 A * | 8/1971 | Lang | ..................... | F26B 17/101 23/313 FB |
| 3,746,254 A * | 7/1973 | Duncan | ................... | B05B 5/032 239/697 |
| 4,057,908 A * | 11/1977 | Mirliss | ................. | F26B 17/101 34/360 |
| 4,186,772 A * | 2/1980 | Handleman | ............ | A62C 31/12 137/891 |
| 4,209,912 A * | 7/1980 | Barker | .................... | B01D 1/18 34/372 |
| 4,368,100 A * | 1/1983 | Pyves | ...................... | A23F 5/34 159/4.01 |
| 4,377,066 A | 3/1983 | Dickinson | | |
| 4,512,736 A * | 4/1985 | Wader | ................... | C04B 20/065 432/13 |
| 4,634,560 A * | 1/1987 | Eckert | ................ | B01F 3/04007 261/76 |
| 4,715,535 A * | 12/1987 | Mulder | ................. | B05B 7/1486 239/1 |
| 4,743,143 A * | 5/1988 | Nagasaka | ................. | G01F 1/74 406/14 |
| 4,880,358 A * | 11/1989 | Lasto | ........................ | F04F 5/22 417/174 |
| 5,186,388 A * | 2/1993 | Chapman | .............. | B05B 7/1431 239/143 |
| 5,475,084 A * | 12/1995 | Okamoto | .............. | B01F 5/0413 34/368 |
| 5,718,539 A | 2/1998 | Segota | | |
| 5,863,155 A | 1/1999 | Segota | | |
| 5,873,680 A * | 2/1999 | Huber | ................... | B05B 7/1404 406/141 |
| 5,882,381 A | 3/1999 | Hauck et al. | | |
| 6,000,995 A * | 12/1999 | Ruholl | ...................... | B24C 5/04 198/548 |
| 6,155,751 A | 12/2000 | Lane et al. | | |
| 6,196,269 B1 * | 3/2001 | Michael | ................ | B05B 7/1404 137/888 |
| 7,048,505 B2 | 5/2006 | Segota et al. | | |
| 7,278,825 B2 | 10/2007 | Segota et al. | | |
| 7,296,411 B2 | 11/2007 | Segota et al. | | |
| 7,475,853 B2 | 1/2009 | Segota et al. | | |
| 7,547,292 B2 * | 6/2009 | Sheldrake | ........... | A61M 5/3015 604/68 |
| 8,052,763 B2 | 11/2011 | Gallot | | |
| 2003/0102038 A1 * | 6/2003 | Lane | .................... | B65G 53/521 137/808 |
| 2003/0148028 A1 * | 8/2003 | Kimura | ................. | B05B 7/1404 427/230 |
| 2004/0205978 A1 * | 10/2004 | Ohdaka | .................... | A24B 3/04 34/591 |
| 2005/0000108 A1 | 1/2005 | Ragnarsson | | |
| 2005/0002742 A1 * | 1/2005 | Bachmann | ............. | B65G 53/28 406/10 |
| 2006/0005581 A1 | 1/2006 | Banba | | |
| 2007/0283510 A1 | 12/2007 | Jeong | | |
| 2009/0277039 A1 * | 11/2009 | Rooksby | ................ | F26B 17/101 34/367 |
| 2012/0034106 A1 * | 2/2012 | Lecoffre | ............. | B01F 3/04985 417/179 |
| 2014/0048719 A1 | 2/2014 | Johnson et al. | | |

FOREIGN PATENT DOCUMENTS

| | | |
|---|---|---|
| GB | 606989 | 8/1948 |
| GB | 2 043 954 A | 10/1980 |
| WO | WO 00/56460 A1 | 9/2000 |
| WO | WO 2007/004785 A1 | 1/2007 |

OTHER PUBLICATIONS

International Search Report—PCT/US2011/058759, Nov. 1, 2011, Flash Rockwell Technologies, LLC.
Written Opinion—PCT/US2011/058759, Nov. 1, 2011, Flash Rockwell Technologies, LLC.

* cited by examiner

NON-THERMAL DRYING SYSTEMS WITH VACUUM THROTTLE FLASH GENERATORS AND PROCESSING VESSELS

REFERENCE TO RELATED APPLICATIONS

Priority is hereby claimed to the filing date of U.S. provisional patent application No. 61/737,154, filed on Dec. 14, 2012 and to the filing date of U.S. provisional patent application 61/900,615 filed on Nov. 6, 2013, each of which is owned by the assignee of the present patent application.

TECHNICAL FIELD

This disclosure relates generally to methods and devices for transitioning a substance (e.g. water) with a vapor pressure threshold from a first phase (e.g. liquid) to a second phase (e.g. vapor) utilizing induced, monitored, and controlled pressure conditions, controlled but relatively low temperatures, and controlled pressure drops. The substance may be separated from a material while in its second phase, and then transitioned back to its first phase, where it is now more purified. Further, the material left behind is substantially drier and can be collected for subsequent re-drying or other treatment, use, or discard. Applications include, but are not limited to, systems for separating water from particulate materials such as, for example, coal wash fines to dry the material; systems for desalinization of seawater; systems for making artificial snow; systems for purifying contaminated water; and generally systems for removing a substance with a vapor pressure threshold from other materials.

Significantly, and unlike many prior commercial drying systems, the methods and systems of the present disclosure obtain such results without applying additional heat derived from the burning fossil fuels. Instead, phase changes and drying are obtained using a controlled sub atmospheric pressure environment, controlled but relatively low temperatures, rapid pressure drops, Bernoulli's principle, continuum hypothesis, Pascal's law, Boyles law, and the law of conservation of energy. In one embodiment, the apparatus includes a vacuum throttle for controlling conditions within the system to meet application specific demands. Materials can be dried while being conveyed through the controlled pressure drops established within the system or can be dried while remaining in a processing vessel wherein temperature and pressure conditions are monitored and manually or dynamically controlled.

BACKGROUND

Pending U.S. patent application Ser. No. 13/285,224 entitled Methods and Systems for Drying Materials and Inducing Controlled Phase Changes in Substances is hereby incorporated by reference in its entirety.

As discussed in the pending patent application incorporated herein, it is common in many industries that various materials or mixtures of materials require drying at some stage of processing. One example among many is the drying of (i.e. the removal of water from) coal and coal wash fines, often in the form of slurries, in the mining industry. Traditionally, industrial drying has been accomplished through application of direct thermal heat to bring a moisture laden material to elevated temperatures at atmospheric pressure so that the moisture will evaporate and/or boil away from the material. This approach, however, requires large amounts of energy to produce and apply the heat. This energy is usually derived from the burning of fossil or other fuels, which is not very efficient, is not generally eco-friendly, and in fact is a pollution generator in its own right. At least partially for these reasons, the burning of fossil fuels in, for example, the coal mining industry and others, to dry material such as coal wash fines is strictly regulated.

The pending patent application, incorporated above, discloses unique methods and systems for drying industrial materials without direct application of thermal energy generated by the combustion of other fuels. These methods and systems have proven themselves extremely effective and efficient for drying many substances such as slurries of coal fines and for other applications such as the desalination of seawater. There exists a continuing need, however, for the ability to control conditions within such systems finely and dynamically to maximize and maintain the efficiency of the systems as materials are dried. A further need exists for the capacity to dry materials while the materials are contained within a processing vessel rather than as they are being conveyed with an air stream moving through the system. It is to an apparatus and to methods that meet these and other needs that the present disclosure and the invention embodied therein is directed.

SUMMARY

Briefly described, systems for drying material without the application of direct heat derived from the burning of ancillary fuels at atmospheric pressure are disclosed. In one aspect, the system includes a flash generator that includes plenum chamber fed by a stream of air from a positive displacement blower in such a way that a vortex is generated within the plenum chamber. A controlled pressure is established and maintained in the plenum chamber. The rotating vortex of air exits the plenum chamber through an outlet at one end and is directed into the mouth of a gradually tapering conical passageway that terminates in a choke point. In the passageway, the velocity of the rotating air stream is increased dramatically, and it exits the passageway through the choke point into a discharge region with a much larger volume than the volume of the choke point. This establishes a pressure in the discharge region that can be substantially less than the pressure in the plenum chamber. A throttle body is disposed in the discharge region and can be moved toward and away from the choke point to vary the effective volume and geometries of the discharge region and thereby vary the sub-atmospheric pressure within the discharge region. The throttle body includes an internal passageway forming a venturi through which air from the discharge region is further directed in a downstream direction.

In one embodiment, material to be dried may be introduced from a holding vessel, which also is maintained at a sub-atmospheric pressure, into the low pressure location of the discharge region, where the extremely low pressure conditions and somewhat elevated temperatures cause moisture or other substances within the material to flash evaporate to vapor almost instantaneously. The vapor is thereby liberated from any solids or dissolved substances within the material and can be separated and recovered if desired. The remaining solids are dried and can be collected for further handling or use. It has been found that vacuum conditions at the choke, at the discharge region, and indeed vacuum conditions within the system as a whole can be adjusted in very fine increments using the vacuum throttle. More specifically, by moving the throttle body toward or away from the choke point and thereby varying the volume of the discharge region, overall system vacuum levels as well as vacuum levels within the choke and discharge region can be raised or lowered and this affects the drying efficiency of the system. Adjusting the throttle body also has been found to affect the overall flow patterns of the air quite dynamically. When an optimum efficiency is reached for a particular material being dried, the throttle body can be fixed to maintain optimum efficiency. The throttle body also can be dynamically controlled with an electronic controller such as a programmable logic controller (PLC) as a material is dried to account for varying properties of the material stream.

In another aspect of the invention, a sealable processing vessel is provided and one or more flash generators with vacuum throttles, as described above, are coupled to the processing vessel. Operation of the flash generator(s) lowers the pressure within the sealed processing vessel and this pressure can be controlled with high precision by adjusting the vacuum throttles of the flash generators. Optimum conditions for flashing moisture in a particular material from a liquid state to a vapor state within the processing vessel can thus be established, controlled, and maintained thereby causing moisture in the material to evaporate within the processing vessel itself. Unlike the prior embodiment, the flash generator is used not to transport the material and dry it during transport, but only to pull the flashed vapor or any liberated vapor from the processing vessel and convey it away from the vessel. As opposed to drying a material as it is conveyed through the flash generator, the material to be dried can be left in the processing vessel for indefinite periods of time as needed until the material reaches a desired moisture content. The moisture levels can be dynamically controlled using, for example, a PLC by measuring material weight before and after drying and making applicable adjustments to the system accordingly. Other conditions such as vessel temperature, vessel pressure, air exhaust moisture levels, and other conditions can be measured and used to adjust operation of the system to maintain desirable conditions. This gives complete control of drying materials to any specified level within the processing vessel.

Thus, improved apparatuses and improved methods are disclosed for finely controlling vacuum conditions within a non-thermal drying system to obtain and maintain optimum drying efficiency. The systems and methods are non-thermal in the sense that they do not include the burning of auxiliary fuel that creates unwanted and highly regulated $CO_2$ emissions. Instead, the systems and methods operate at relatively low internal temperatures naturally induced by friction within the system. This also makes the systems appropriate for drying thermally sensitive product streams since temperatures are low compared to those found in traditional thermal dryers. These and other features, aspects, and advantages of the invention will be better appreciated upon review of the detailed description set forth below taken in conjunction with the accompanying drawing figures, which are briefly described as follows.

DETAILED DESCRIPTION

Figure 1:
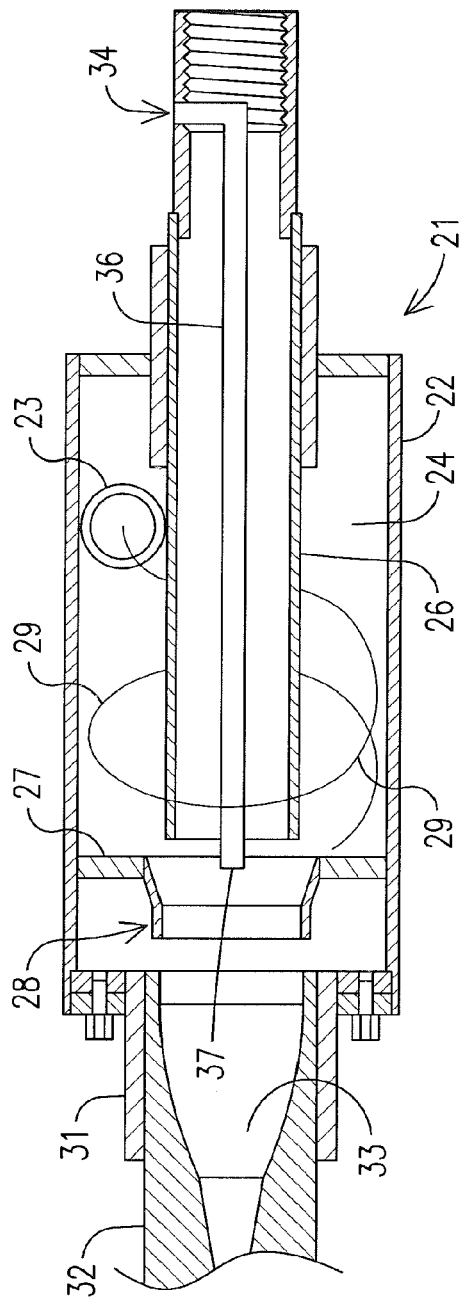
FIG. 1 is a cross-sectional view of a portion of a system according to the invention showing the vortex generating plenum of the system.
Figure 2:
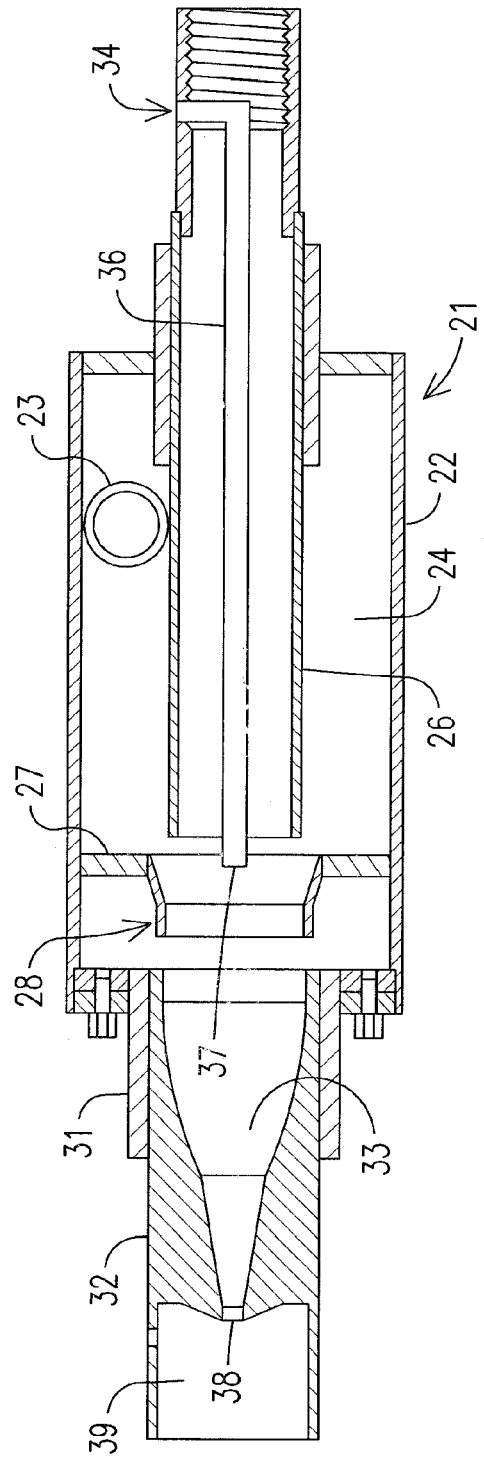
FIG. 2 is a cross-sectional view showing one embodiment of a velocity accelerator attached to the downstream end of the plenum chamber.
Figure 3:
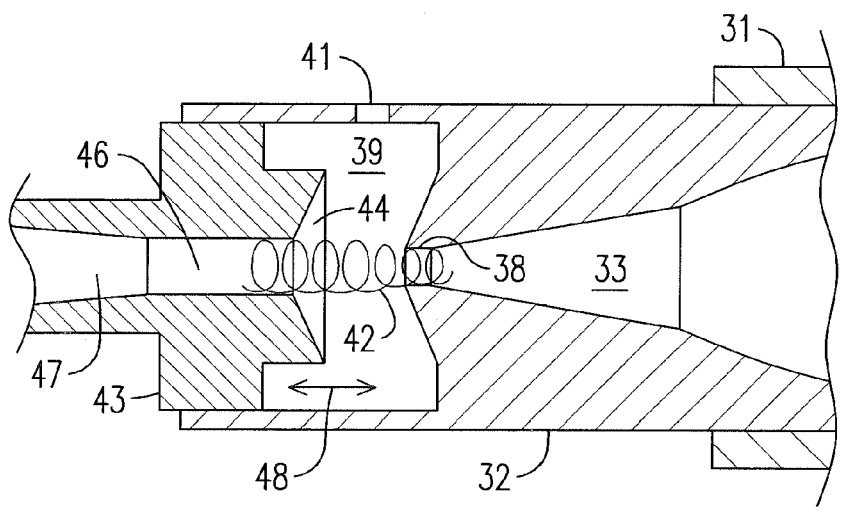
FIG. 3 is an enlarged cross-section of a portion of the system showing the choke point of the velocity accelerator, the discharge region, and the throttle body of the system, which together form the vacuum throttle.
Figure 4:
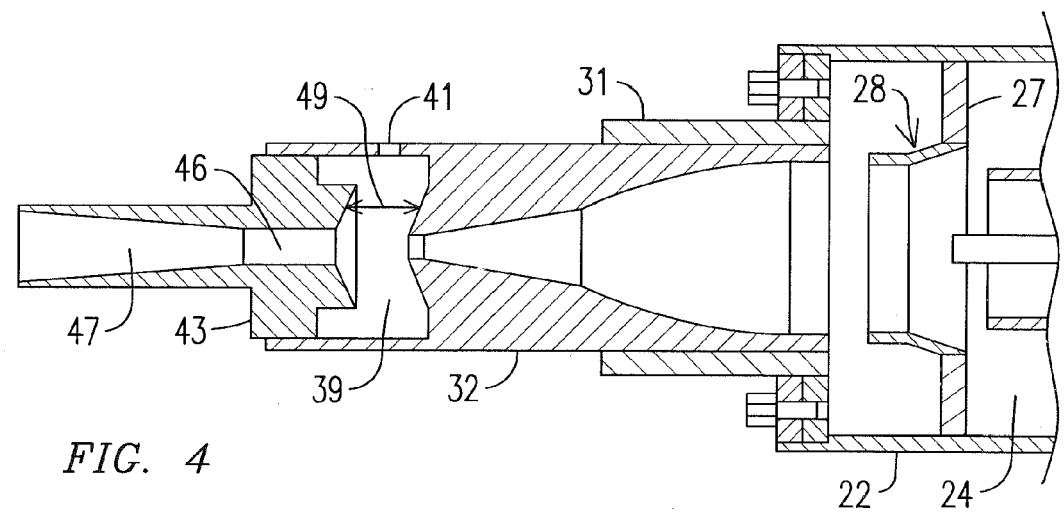
FIG. 4 is a cross-section of the vacuum throttle adjusted toward the choke point to form a discharge region having a relatively smaller volume.
Figure 5:
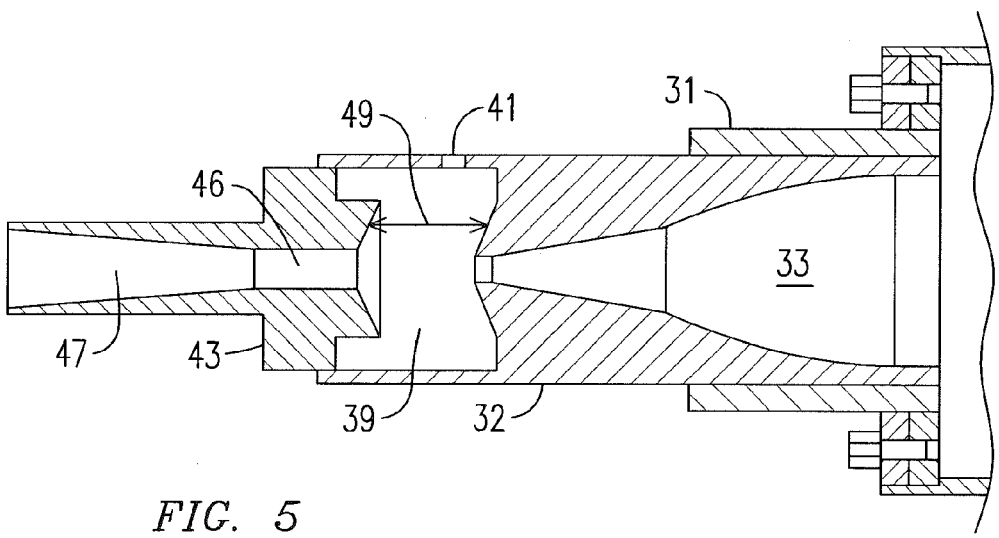
FIG. 5 is a cross-section of the vacuum throttle adjusted away from the choke point to form a discharge region having a relatively larger volume.

Reference will now be made to the annexed drawing figures, wherein like reference numbers indicate like parts throughout the several views. FIG. 1 shows in cross-section a portion of a system according to one aspect of the invention. The system 21 includes a plenum 22 having an air inlet 23 and defining an interior plenum chamber 24. The plenum chamber is substantially cylindrical in shape in this embodiment and the inlet 23 is arranged to direct an air stream generally tangentially into the plenum chamber 24. A bulkhead 27 is disposed at a downstream end of the plenum chamber and an outlet 28 is disposed in the bulkhead through which air is expelled from the plenum chamber. A cylindrical core 26 extends axially through the plenum chamber 24 and terminates adjacent the outlet 28. In the embodiment illustrated in FIG. 1, a media conduit 36 extends axially through the cylindrical core 26 for introducing material to be dried into an air stream or for introducing additives or other substances. As air from a remote positive displacement pump (not shown) is introduced tangentially into the plenum chamber 24, it creates a pressurized spinning vortex 29 within the airstream in the plenum chamber 24. The spinning air stream exits the plenum chamber through the outlet 28 and continues to spin.

Figure 6:
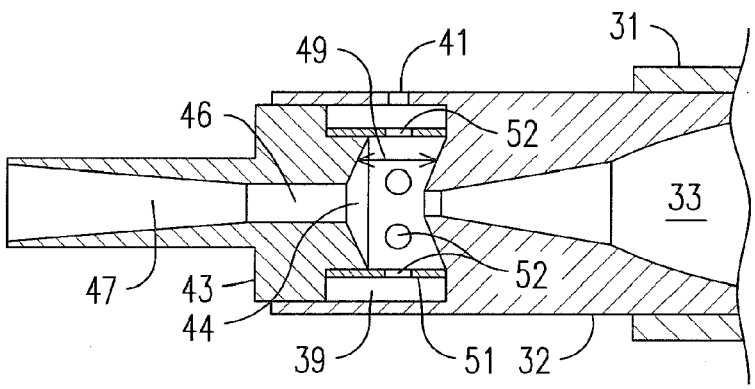
FIG. 6 is a cross-section showing a collar within the discharge region for fixing the position of the throttle body and thereby the volume of the discharge region.
Figure 7:
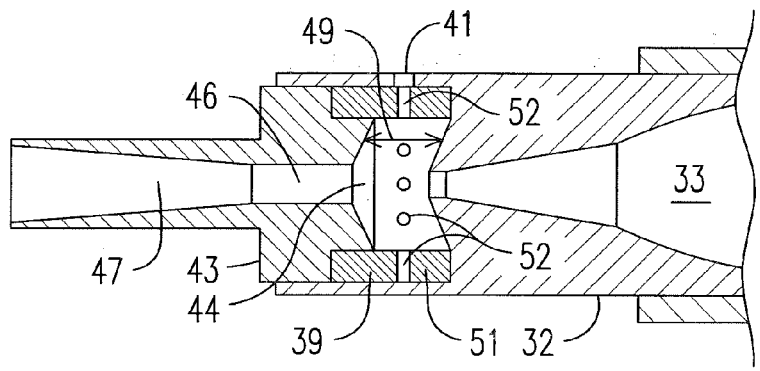
FIG. 7 is a cross-section of the vacuum throttle illustrating one configuration of inlet orifices for introducing material to be dried into the system.

A coupler 31 is mounted to the downstream end of the plenum 22 and a velocity accelerator 32 according to the invention is mounted to the coupler for receiving an air stream from the outlet 28. The velocity accelerator 32 is formed with a gradually tapering internal passageway 33 that terminates in a choke point orifice 38 as illustrated in FIG. 2. The choke point orifice communicates with a discharge region 39 that may be sealed from outside ambient pressure and temperature. The conditions within the discharge region are thereby completely controllable independent of ambient conditions. The spinning vortex of air from the plenum chamber enters the passageway 33 of the velocity accelerator 31 and is gradually, smoothly, and quickly accelerated to exceedingly high rotational velocities to reduce its pressure drastically according to Bernoulli's principle. The resulting high velocity low pressure circulating air stream exits through the choke point orifice 38 and is discharged into the much larger volume of the discharge region 39 (FIG. 3).

As shown in FIG. 3, a throttle body 43 is configured to be received in the end of the discharge region 39 in such a way that it can be moved toward and away from the choke point orifice 38 as indicated by arrow 48 to decrease or increase the volume of the discharge region 39. The throttle body 43 is formed with an internal passageway having an inwardly tapering upstream portion 44, a throat portion 46, and an outwardly tapering downstream portion 47. This passageway thus forms a venturi. A port 41 communicates with the discharge region and can be coupled to a source of material to be introduced into the system for drying or to a pressure transducer or gauge for measuring a pressure within the discharge region 39. As detailed below, in another embodiment, the port also may be coupled through a vacuum conduit to a processing vessel for establishing pressure conditions within the vessel.

The high velocity low pressure vortex 42 exits the choke point orifice 38 into the discharge region to establish a very low pressure rotating vortex environment in the discharge region. The temperature within the discharge region is elevated due to the natural friction within the positive displacement blower, friction within the plenum and the velocity accelerator, and heat generated from compression of air. However, this temperature is substantially less than temperatures generated in traditional material dryers where high temperatures are created by burning ancillary fossil fuels and applying the resulting heat to material to be dried.

The air stream, which may now include entrained material, then flows from the discharge region into and through the internal venturi passageway of the throttle body 43.

Preferably, the choke point 38 is configured and sized to maintain a positive backpressure between about 2 psig and about 10 psig in the plenum chamber compared with atmospheric or ambient pressure from which the positive displacement blower (not shown) feeds. This back pressure within the plenum chamber could be much higher than this range depending upon the characteristics of materials being processed. The air from the positive displacement blowers has a naturally higher temperature not induced by external heat sources, but rather due to compression and friction within the blower system. It has been found that this temperature can be as high as about 200° F. or higher. Thus, the plenum chamber also functions as a heat reservoir and this heat is transferred to the air stream moving downstream from the plenum chamber.

The moderately heated spinning vortex of air in the plenum chamber is forced by the positive pressure of the plenum chamber through the velocity accelerator and its speed is accelerated greatly as it moves through the gradually narrowing passageway 33 to the choke point 38. In this regard, the choke point has two functions. The first is to regulate the positive pressure within the plenum chamber. The larger the orifice of the choke point, the lower the backpressure within the plenum chamber. The second function of the choke point is to speed the air up as efficiently and smoothly as possible as the air transits into the discharge region. In this way, the least amount of energy is lost as the air moves through and beyond the choke point 38.

It has been found that with relatively low backpressures between 2 and 10 psig in the plenum chamber, the spinning air stream can be accelerated to several hundreds of miles per hour as it moves through the velocity accelerator and the choke point. The pressure of the stream is thereby drastically lowered at the choke point 38. This high velocity, low pressure, spinning air stream exits the orifice of the choke point 38 into the discharge region of the vacuum throttle, which creates a spinning, very low pressure, naturally heated airstream within the discharge region. This airstream moves through the discharge region and enters the internal venturi passageway of the throttle body as shown in FIG. 3.

The inventor discovered somewhat surprisingly that by moving the throttle body 43 toward or away from the choke point 38, thereby varying the effective volume of the discharge region, the vacuum created in the discharge region and the overall flow patterns of the air change dramatically. It has been found that in most cases, moving the throttle body closer to the choke point to reduce the volume of the discharge chamber increases the vacuum level in the discharge region. However, at a certain distance from the choke point, the vacuum level in the discharge region begins to drop. So, there is a "sweet spot" for the throttle body that is dependent on areas, geometries, air speed, choke point orifice size and other factors where the vacuum level is highest and moving the throttle body away from this sweet spot in the downstream direction reduces the vacuum level progressively. The term "vacuum throttle" was coined to refer to this phenomenon.

FIG. 4 illustrates the throttle body 43 adjusted inwardly to a distance 49 from the choke point, thereby forming a discharge region of smaller volume. FIG. 5 illustrates the throttle body 43 adjusted outwardly to a larger distance 49 from the choke point, thereby defining a discharge region of larger volume. The optimum vacuum for a particular material to be introduced into the system for drying at the system temperature can be determined by manipulating the position of the throttle body. Then, as shown in FIG. 6, the position of the throttle body 43 can be fixed by, for example, inserting a cylindrical spacer 41, which maintains the position of the throttle body with respect to the choke point orifice. Orifices 52 may be formed through the wall of the cylindrical spacer 51 so that the media or measurement port 41 can maintain communication with the discharge region 39. As shown in FIG. 7, the number and/or sizes of the orifices 52 can be varied depending upon the nature of a material to be introduced to the system through the port 41.

Figure 8:
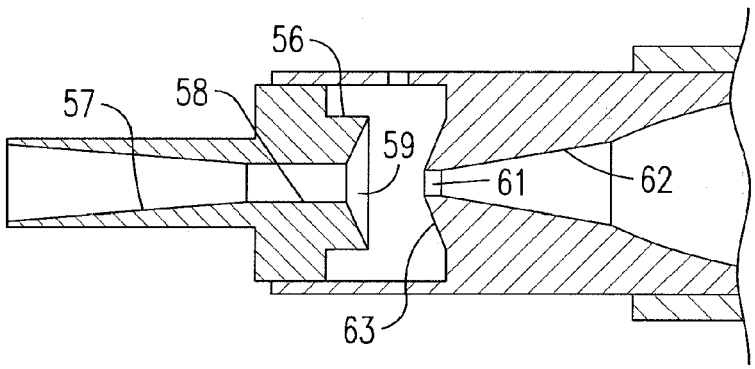
FIG. 8 is a cross-section of the vacuum throttle illustrating surfaces that can be configured in a variety of ways to affect the drying efficiency to suit a particular application.
Figure 9:
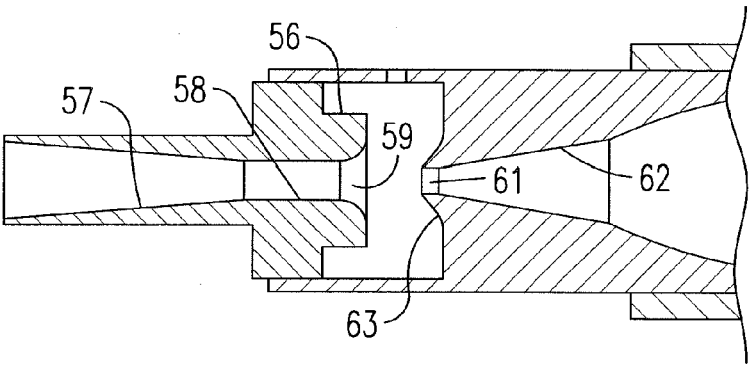
FIG. 9 is a cross-section of the throttle body with one possible alternate configuration of its various surfaces.

The inventor also discovered that the performance of the system for drying materials can be modified or changed by varying the discharge areas and/or geometries of the various surfaces that contain the moving air stream. FIGS. 8 and 9 illustrate this discovery, where surfaces that can be changed in shape, diameter, size, profile, or other characteristic are indicated with reference numbers 56, 57, 58, 59, 61, 62, and 63. FIG. 9 shows one of many possible examples where surfaces 59, 63, and 62 are seen to have been altered in configuration. More specifically, these surfaces are seen to be smoothly curved in FIG. 9 as compared to being generally conical as illustrated in FIG. 8. Further, as detailed below with reference to FIG. 15, some or all of these surfaces may be changed in shape dynamically using pneumatic and/or hydraulic bladders lining the surfaces. Alternatively, orifice sizes and shapes and surface configurations may be changed and/or controlled using mechanical means such as, for instance, an arrangement similar to the adjustable turkey feathers at the outlets of many military jet engines. Such an arrangement also may be used to control the direction of airflow within the system similar to the way they can vector the exhaust of a jet engine. The invention contemplates any and all possible configurations and sizes of surfaces and all possible means and methods of changing or varying them to meet virtually any application specific demands.

Figure 10:
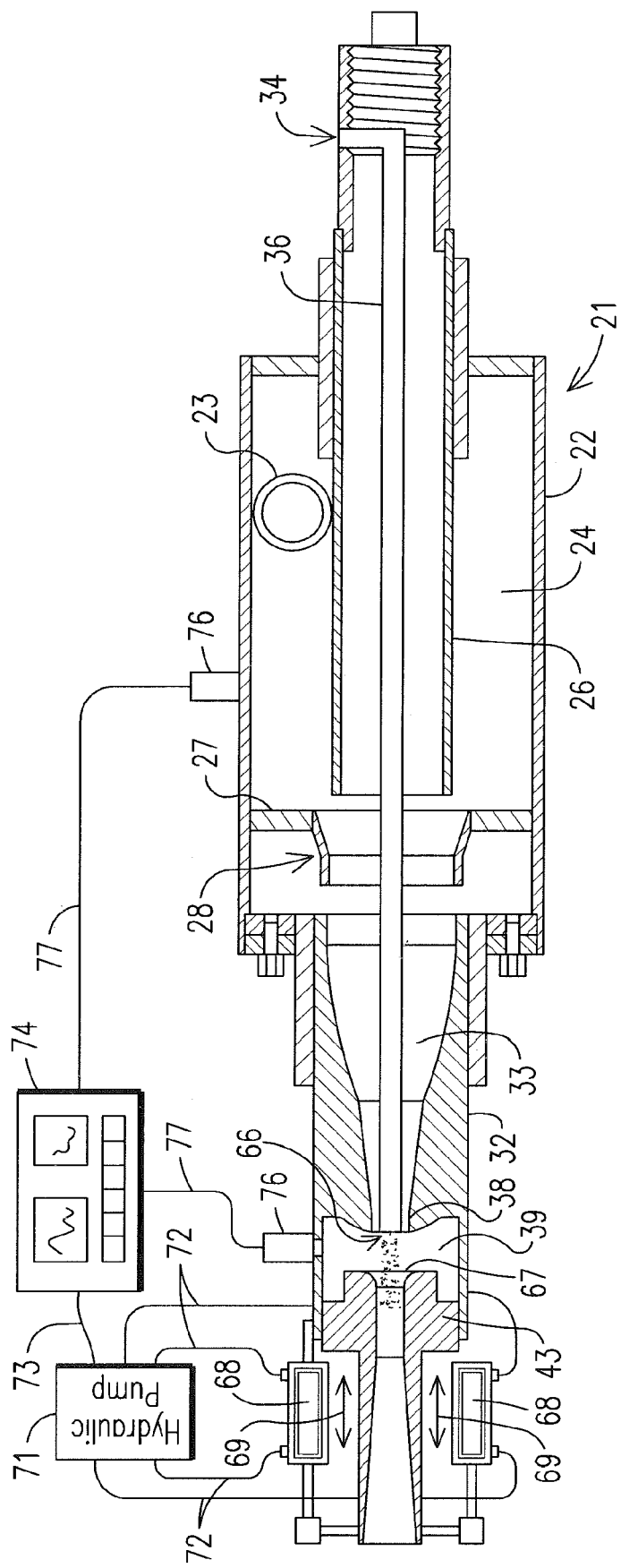
FIG. 10 is a cross-section showing a system for drying a material of a more liquid consistency wherein the material is introduced into the discharge region of the vacuum throttle through a spray nozzle and wherein the volume of the discharge region is dynamically varied using a programmable logic controller.

FIG. 10 illustrates an apparatus for non-thermal drying according to the invention and that incorporates dynamic control of the vacuum throttle of the system. The apparatus, mostly described above, comprises a plenum 21 defining a plenum chamber 24 fed through an air inlet 23 and having a bulkhead 27 supporting an outlet 28. The plenum receives air from a blower (not shown) to generate a positive pressure within the plenum chamber. A velocity accelerator 32 is mounted to the end of the plenum 21 and includes a gradually narrowing passageway 33 terminating in a choke point orifice 38. In this embodiment, a media delivery conduit 36 has an inlet end 34 and extends axially through the core 26, through the narrowing passageway 33, and terminates in a spray nozzle 66 configured to spray or expel low viscosity and more liquid materials to be dried directly into the low pressure discharge region 39. Throttle body 43 is mounted for movement toward and away from the choke point 38 as described above to decrease or increase the volume of the discharge region as needed to establish a desired vacuum level.

A set of dual direction (indicated by arrows 69) hydraulic rams 68 are secured at one end to the downstream end of the velocity accelerator 32 and the other ends of the rams are coupled to the downstream end of the throttle body 43. It will thus be seen that when the hydraulic rams contract, they move the throttle body to reduce the volume of the discharge region and when the rams expand, they increase the volume of the discharge region. The hydraulic rams are fed by a hydraulic pump 71 that, in turn, is controlled by a PLC 74 or other programmable device such as a computer. The PLC 77 receives vacuum information from a pair of vacuum transducers 76 through corresponding wires 77. The PLC is programmed to maintain a prescribed set of vacuum or pressure conditions within the system during operation. This is done by continually sensing vacuum levels and adjusting the hydraulic rams 68 or other adjusting mechanism to maintain those levels within a specified range. In this way, changes in system operating conditions such as variations in the density, moisture content, temperature, etc. of the injected material, can be compensated for dynamically and in real time to maintain optimum vacuum conditions within the system. Alternatively, the throttle body can simply be selectively settable by a user through access to the programmable logic control.

In any event, when the material to be dried is introduced into the controlled high vacuum elevated temperature discharge region 39, it encounters the very low pressure, high velocity, rotating, naturally heated airstream therein. This causes moisture (or another targeted substance within the material) to flash evaporate virtually instantaneously because its vapor pressure at the temperature of the discharge region is suddenly far above the pressure within the discharge region. The resulting vapor and any solids or dissolved materials, now separated; flow downstream through the venturi channel of the throttle body, which aids further in vaporizing liquid from the airstream because of its own venturi design. The vapor and remaining solids and other dissolved substances exit the system through a media and air discharge at the downstream end of the throttle body, from where they may be further treated, separated from one another, or collected.

It has been found that in the above drying mode, referred to as the conveyor mode, where material to be dried is injected into and conveyed along with the air stream within the dryer, if the throttle body is too close to the choke point 39, the inlet port at the discharge region can become clogged. Accordingly, when used in this conveyor mode, the vacuum throttle should be adjusted as far away from the choke point orifice as possible while still retaining in the discharge region the vacuum conditions required to dry the subject material.

Figure 11:
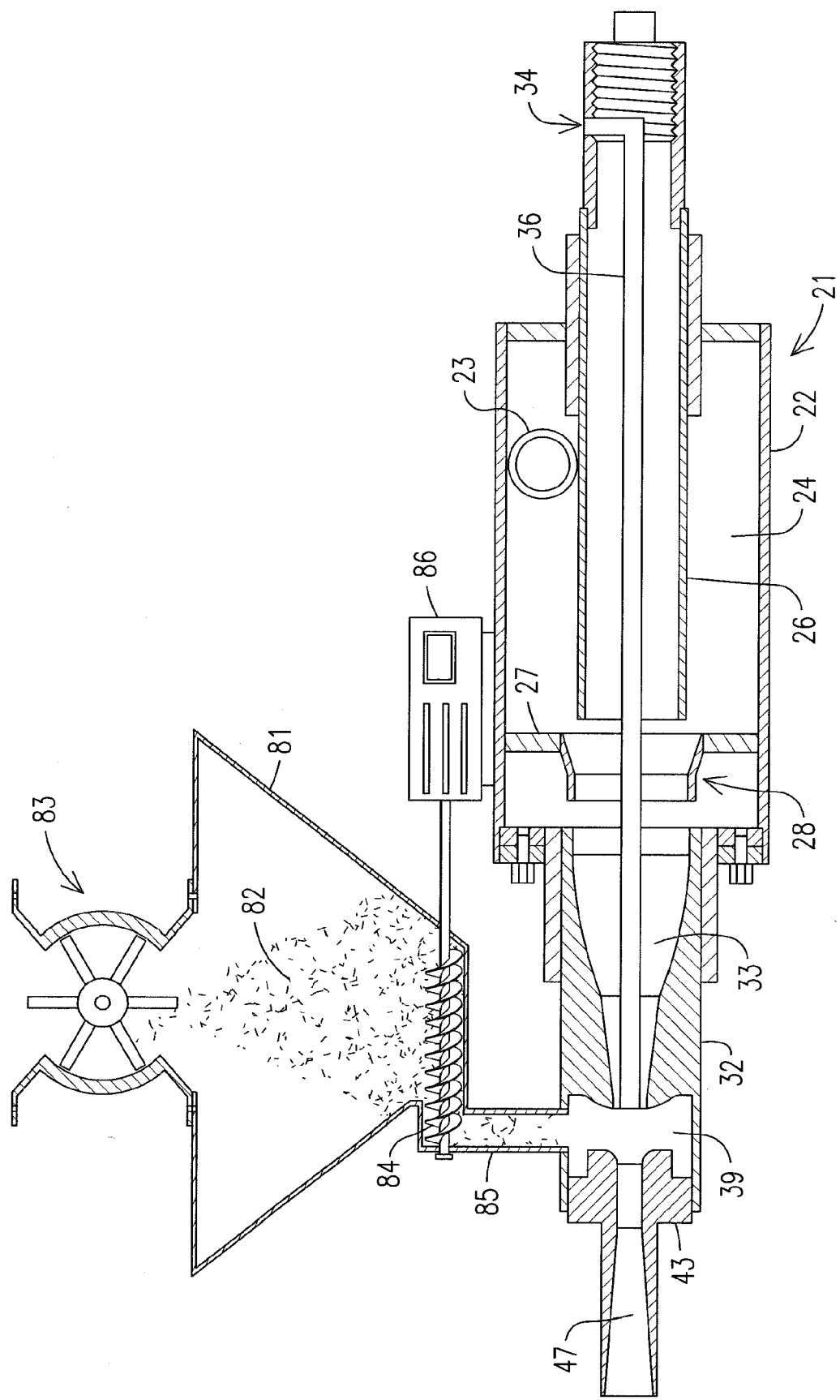
FIG. 11 is a cross-section showing one possible embodiment of a system incorporating a vacuum throttle according to the invention for drying materials with a more solid consistency.

FIG. 11 illustrates a possible embodiment of the present invention for treatment of materials of a higher viscosity more solid state as opposed to the embodiment of FIG. 10 that treats materials of a lower viscosity more liquid state. In the embodiment of FIG. 11, material to be dried is still fed to the system at the location of the discharge region 39, but is conveyed there in a different manner. More specifically, material 82 is fed through an airlock 83 into a hopper 81 maintained at a sub-atmospheric pressure by the non-thermal dryer with which it communicates. The material is then conveyed from the bottom of the hopper 81 to a chute 85 by an auger 84 of a metered or processed feed device 86 (or any alternate method of delivering and dispersing product to be processed in the properly metered fashion). The material is then drawn through the chute 85 by the vacuum maintained within the discharge region 39, where moisture within the material is immediately flash vaporized as described above. The resulting separated vapor and dry solids traverse the venturi channel extending through the throttle body to exit through the downstream or discharge end of the throttle body for further handling. As with the prior embodiments, the volume of the discharge region can be adjusted manually, automatically, and dynamically, or simply fixed at a size known to be optimum for the material being dried.

Figure 12:
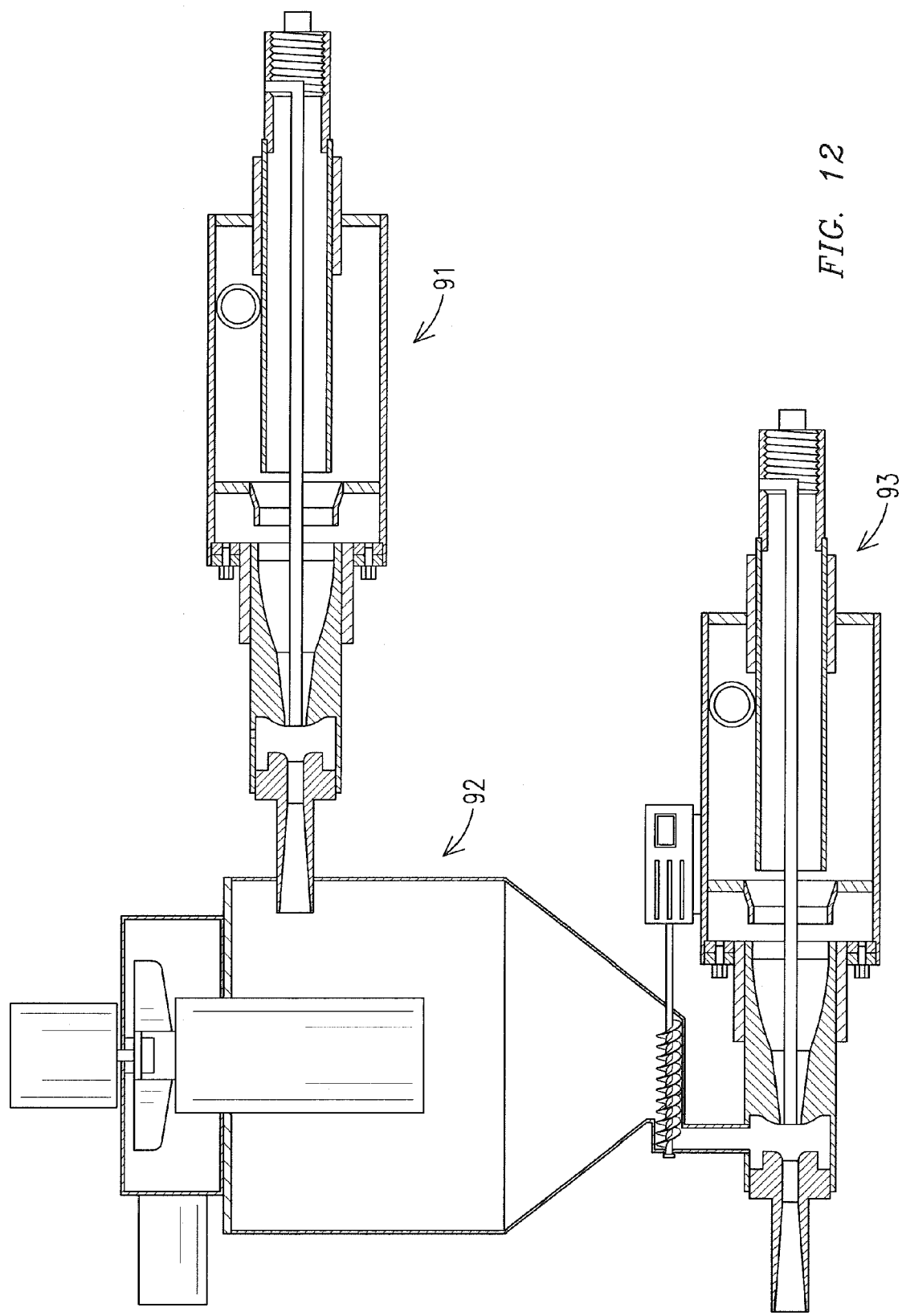
FIG. 12 is a cross-section showing one possible embodiment of a system incorporating vacuum throttles for drying and separating substances within a material using a pair of systems of the present invention in conjunction with a cyclone separator.

FIG. 12 illustrates another possible embodiment of a system according to the invention for a dual liquid-solid drying. A first non-thermal dryer 91 according to the principles of FIG. 10 receives a less viscous slurry of liquid and solids, which is conveyed by the media conduit 36 to the discharge region as described. Here, liquids are flash evaporated and the remaining solids and resulting vapor are discharged into a cyclone separator 92. In the cyclone separator, the solids gradually swirl to the bottom of the separator chamber while the vapor is drawn upwardly by the fan of the separator to be collected, re-condensed, discharged, or otherwise handled. In the mean time, the solids in the bottom of the separator chamber are fed to a second non-thermal dryer 93 according to FIG. 11, where they are further dried and discharged for additional handling.

Figure 13:
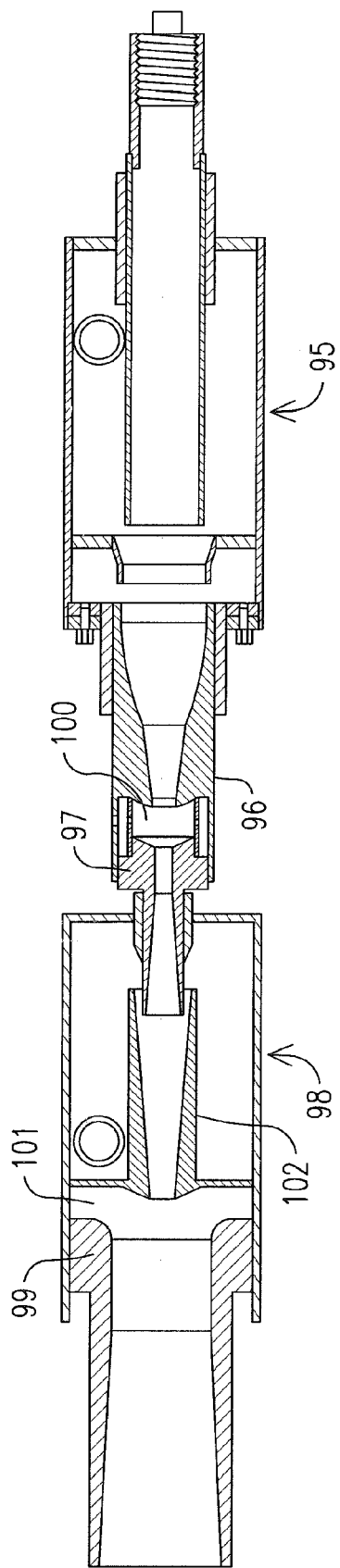
FIG. 13 is a cross-section illustrating another possible embodiment of a system for drying substances using two devices of the present invention in series with one another.
Figure 14:
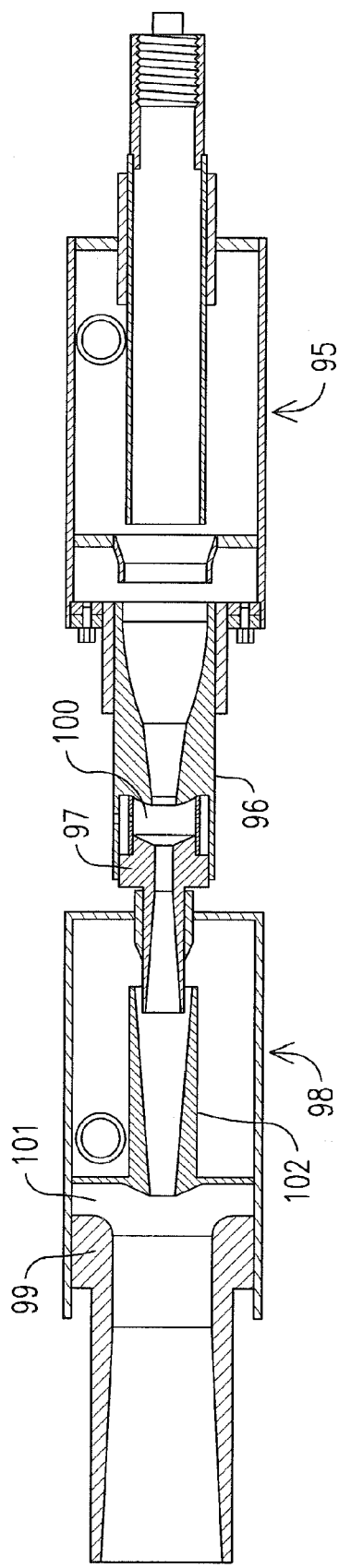
FIG. 14 is another cross-section illustrating the system of FIG. 13.

FIGS. 13 and 14 illustrate yet another embodiment of the present invention wherein a pair of non-thermal dryers each having a vacuum throttle are coupled together in series. The first dryer 95 has a plenum chamber that feeds a spinning air stream through an outlet to the gradually narrowing internal channel of a velocity accelerator 96. A throttle body 97 is adjusted to provide an optimum volume of the discharge region 100 of the first dryer. A first stage of drying is thus accomplished in the first dryer 95. The material, now at least partially dried, is discharged into the inlet of a venturi 102 within a second plenum chamber. The velocity of the material is accelerated again through the gradually narrowing venturi 102 and is discharged into a second discharge region 101, the volume of which is controlled and/or set by the positioning of a second throttle body 99. Thus, the partially dried material is dried a second time.

The system of FIGS. 13 and 14 has two locations with a vacuum throttle, the second designed to "finish off" or complete the separation of any remaining moisture from a material. The intake ports, media feed orifices, and exhaust ports can be adjusted dynamically as described above to maintain optimum performance of the system in real time. Such adjustments can be accomplished with a mechanical system similar to a camera shutter, or hydraulically or pneumatically by means of bladders that can be inflated or deflated as needed. These devices can be connected to and controlled by a computer or controller that monitors vacuum conditions within the system and makes adjustments to control these conditions. In this or any of the systems described herein, a vacuum port can be used to introduce ambient air or any chemical or additive that could benefit or change the material being processed, thus further enhancing the drying process.

Figure 15:
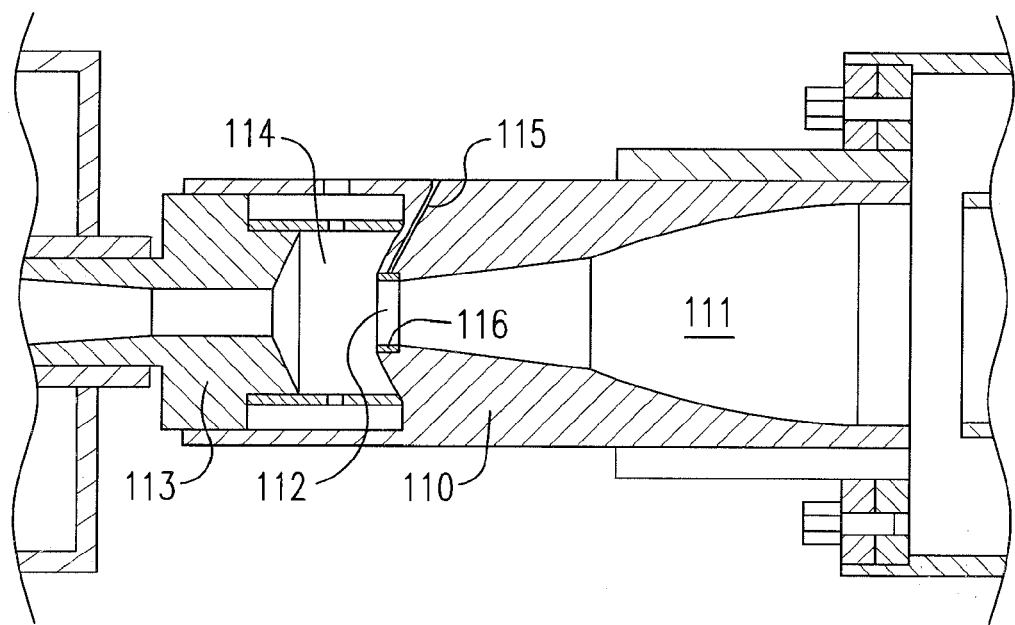
FIG. 15 is an enlarged cross-section of a system according to the invention showing one technique for reconfiguring surfaces within the system using hydraulic or pneumatic bladders.

FIG. 15 illustrates the use of an inflatable bladder according to the invention to change the size and/or configuration and/or contours of various orifices and surfaces throughout the system. The system here has a velocity accelerator 110 with a gradually narrowing internal passageway 111 terminating in a choke point orifice 112. A throttle body 113 is disposed in the downstream end of the accelerator 110 and is adjusted to provide a discharge region 114 having a desired volume. A bladder 116 is disposed in the choke point orifice and is coupled through a conduit 115 to a controllable source of pneumatic or hydraulic media. Introduction of pneumatic or hydraulic media into the bladder causes it to inflate, thus narrowing the diameter of the choke point. Draining of pneumatic or hydraulic media from the bladder causes it to deflate thereby increasing the diameter of the choke point. The source of hydraulic or pneumatic media can be controlled by a PLC that monitors vacuum conditions within the system and makes adjustments as needed to maintain a predetermined set of conditions. The shapes, contours, and/or dimensions of other areas of the system can be controlled in the same manner if desired. The PLC also can be coupled to transducers for determining other parameters such as temperatures, product moisture levels, product density, or any other parameters related to production efficiency. The PLC can thus be used to control many parameters by appropriate adjustments to the vacuum throttle, surfaces, jets, and exhaust nozzles of the system.

One application of the system and methods described above is for desalinization of seawater to produce potable water for human use. In such an application, a system according to the invention can be set up next to an arid desert area that has little to no annual rainfall. Seawater from a nearby supply is then pre-heated to close to 200 degrees F. by passing it through a clear and magnifying conduit that intensifies the energy from the sun to heat the seawater. The preheated seawater is then discharged into the discharge region or regions of the system, which also may be made of transparent materials for admitting solar energy and/or otherwise makes use of concentrated solar energy to generate heat. Reflectors may be disposed to focus solar energy at the discharge chambers, where flashing occurs, an onto the discharge lines. In this way, production of potable water is enhanced using energy from the sun. Such a system makes use of low pressure, heat from positive discharge blowers, and the energy of the sun to vaporize and distil brackish or salt water. When the resulting vapor is re-condensed, it is collected as potable desalinated water that is cleaner and more pure than water produced by current reverse osmosis techniques. The leftover solids are not a brackish briny waste stream as in reverse osmosis, but rather dried sea salt (and other dissolved minerals) that can be converted for human consumption.

FIGS. 16-19 illustrate yet another embodiment of the invention wherein material to be dried is contained with a processing vessel during the drying process rather than being dried while being conveyed through pressure drop zones within a non-thermal dryer (often referred to below as a "flash generator"). To dry any media from salt water to coal, media can be placed in an environment within which water (or another target substance) cannot exist in liquid form. Once this environment is established, it must be maintained until a desired amount of water is evaporated and liberated from the media. This is the methodology embodied in the embodiments of the invention shown in FIGS. 16-19, wherein a pressure vessel 133 encloses the environment within which conditions are established and maintained and media or material is left in that environment until a desired degree of drying is accomplished.

It has been discovered that drying material within the processing vessel or vessels provides more complete control over the drying process. Conditions within the processing vessel or vessels such as, for instance, sub-atmospheric pressure conditions, temperatures, dwell time in the vessel, etc., can be controlled independently to provide precise drying conditions in each vessel, which is more effective and predictable when drying materials. One possible embodiment of an apparatus that embodies aspects of this discovery is illustrated schematically in FIG. 16. A processing vessel 133 receives material to be dried from a feed hopper 131. An air lock 132 separates the two so that sub-atmospheric pressure can be established and maintained in the processing vessel 133. The processing vessel itself will be described in more detail below, but generally defines an interior volume for containing material and a mechanism for moving material through and out of the vessel at a predetermined rate.

A pair of positive displacement blowers 136 and 137 supply naturally heated exhausts that feed a corresponding pair of flash generators 141 and 142, each of which incorporates a vacuum throttle 145 as described in detail above. The exhausts of the blowers are heated naturally by friction and compression within the blowers and are delivered to respective flash generators 141 and 142 via conduits 138 and 139. This generates a rotating vortex of heated pressurized air within the plenum chambers of the flash generators, as detailed above. In turn, the exhausts of the flash generators 141 and 142 are delivered through conduits 146 and 147 to a cyclone separator 148.

A portion of the heated air from the blowers 136 and 137 is delivered to the processing vessel 133 through conduits 149. Moisture laden air and vapor is removed from the processing vessel 133 by flash generator 142 through conduits 144. Thus, a constant supply of heated air is delivered to the processing vessel and moisture and vapor are constantly drawn from the vessel. A vessel outlet 152, which may incorporate a screw or auger feed mechanism, is configured to deliver material from the processing vessel 133 to the discharge region of the larger flash generator 141, the conditions within which are controlled by the vacuum throttle 145 as detailed above. The dwell time of material within the vessel can thus be controlled by the transfer rate of the feed mechanism.

Sub-atmospheric pressure conditions are established, controlled, and maintained within the processing vessel 133 through vacuum conduits 143 and 144, which communicate between the processing vessel and the discharge regions of respective flash generators 141 and 142. It has been found that many conditions within the processing vessel including pressure, temperature, capacity, area displacement, dwell time of materials, and the like can be precisely controlled and maintained or changed dynamically by controlling parameters of the system such as blower speed, vacuum throttle positions, screw feed RPM, and the like, as described in more detail below. Generally, however, flash generator 142 functions only to remove continuously liberated moisture and vapor from the vessel and deliver it to the cyclone separator. A portion of the heated air from the blowers is diverted from the plenum chamber of the flash generator 141 through conduits 149 and into the processing vessel. This flash generator also functions to receive dried material from the processing vessel at its discharge region 145, which provides an additional drying step and delivers the dried material to the cyclone separator 148.

Figure 18:
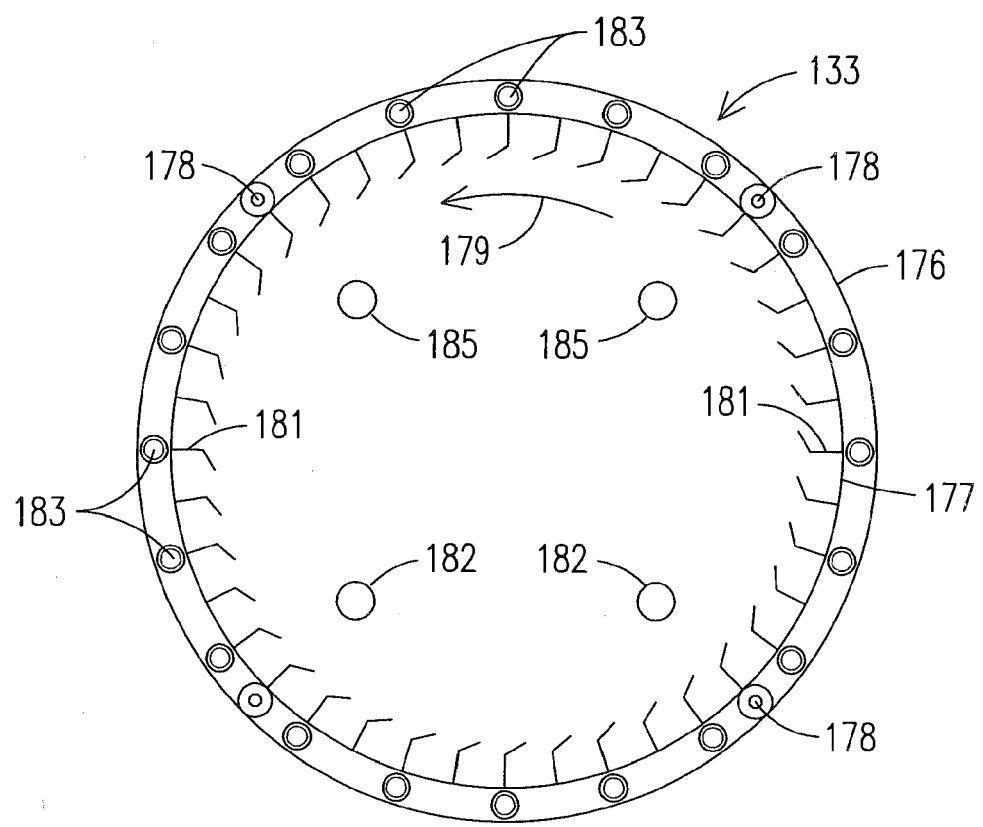
FIG. 18 illustrates one possible configuration of a processing vessel for containing and agitating material within the vessel as it is dried according to the present invention.
Figure 16:
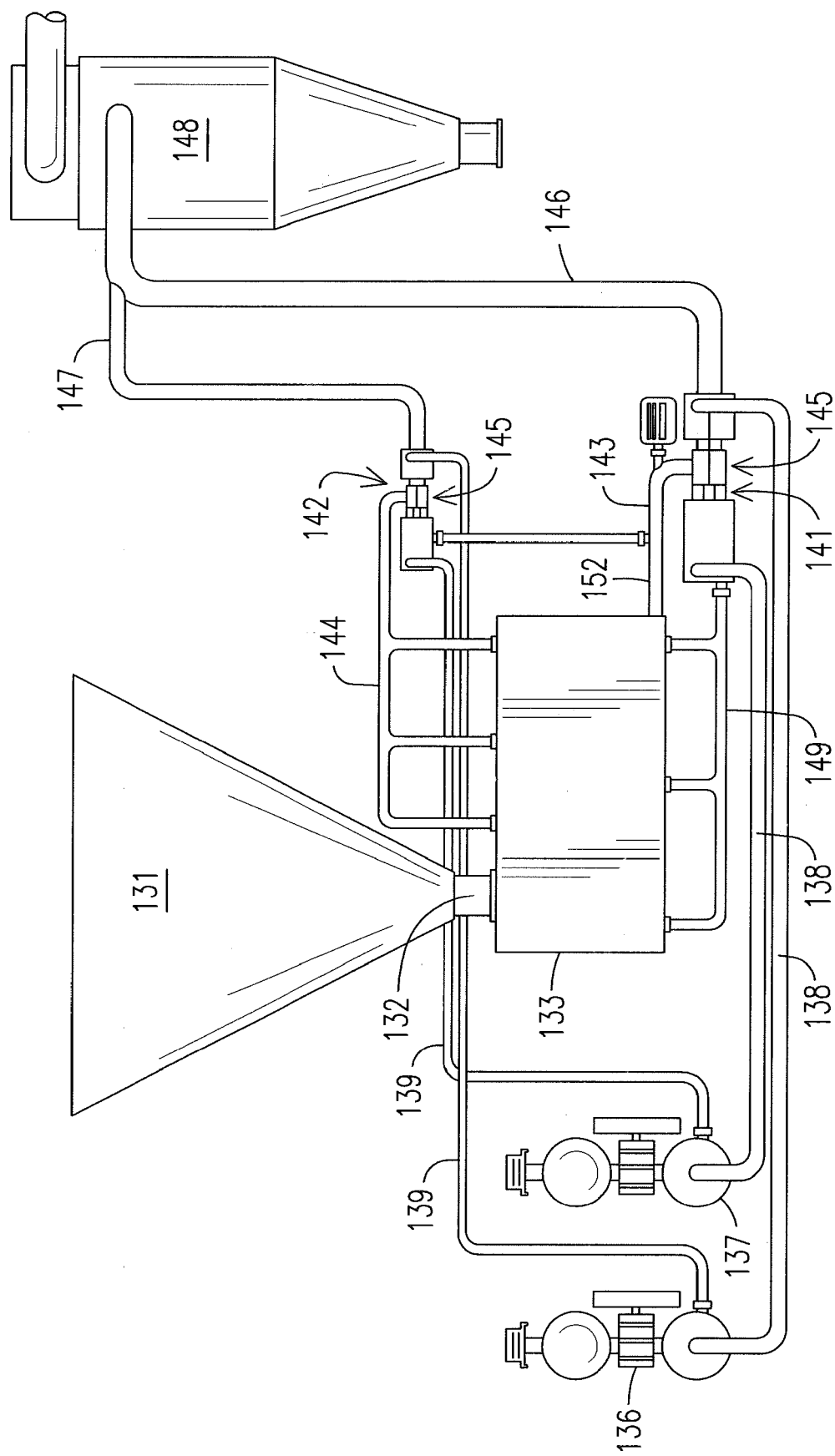
FIG. 16 is a schematic view of a system for drying material that incorporates a processing vessel wherein the material remains during the drying process.
Figure 17:
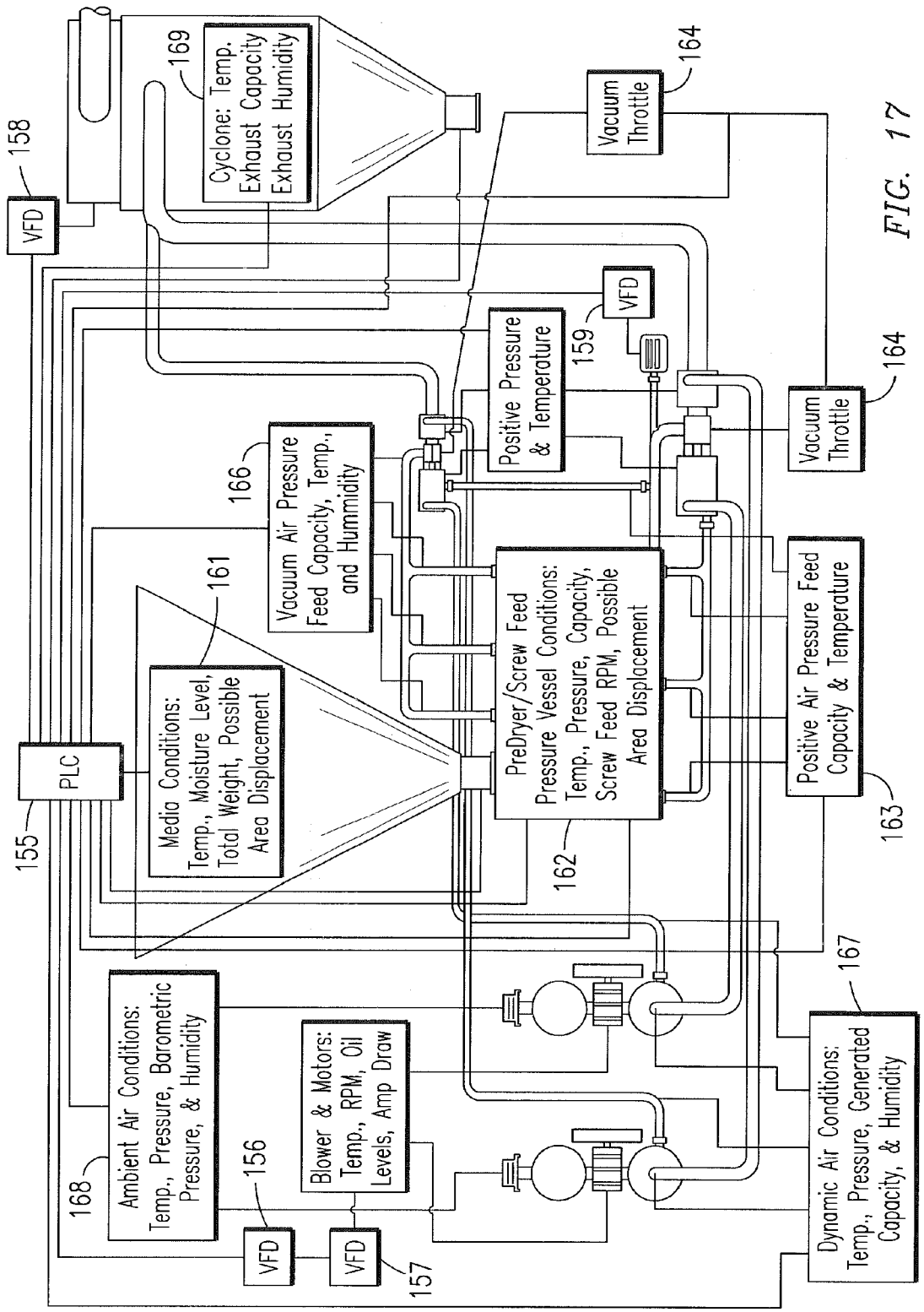
FIG. 17 is a schematic view of the system of FIG. 16 with the addition of a programmable logic controller for monitoring and controlling various parameters of the system during operation.

Before discussing FIG. 17, reference is made to FIG. 18, which illustrates in simplified schematic form one configuration of a processing vessel that embodies principles of the invention. The processing vessel 133 of this configuration comprises an outer vessel 176 that contains an inner vessel 177, which receives material to be dried. The inner vessel 177 is rotatable within the outer vessel 176 and may, for this purpose, be supported by rollers 178 disposed between the inner and outer vessels. Heated air inlets 182 (coupled to inlet conduits 149 in FIG. 16) continuously deliver heated air from a blower or blowers to the inner vessel. Vacuum outlets 185, which are at a lower pressure than inlets 182, draw moist air and vapor from the inner vessel 177 for delivery to the cyclone separator. A constant sub-atmospheric pressure is thus maintained within the processing vessel.

Preferably, hot water tubes 183 extend through the space between the inner and outer vessels and may carry a flow of hot water to supply insulation and additional heat to material within the inner vessel as it is dried. Agitation vanes 181 preferably are arranged within the inner vessel 177 such that when the inner vessel is rotated in direction 179, material within the inner vessel is continuously agitated, aerated, and mixed to expose the maximum surface are of the material to the conditions within the inner vessel. The vanes preferably are configured or the processing vessel tilted so that material within the inner vessel moves progressively toward the vessel outlet 152 (FIG. 16). The rotation rate of the inner vessel in this embodiment thus determines the dwell time within the vessel for material being dried.

In a preferred embodiment, material to be dried is heated by exposure to hot air entering the inner vessel through inlets 182 and by heat from hot water tubes 183 between the outer vessel and the inner vessel. The inner vessel preferably is maintained at sub-atmospheric pressure, sometimes referred to as a partial vacuum, of roughly ½ atmospheres. The vapor pressure of moisture within the material is thus raised significantly above its normal vapor pressure at atmospheric pressure. Under these conditions, the heated air entering the vessel and heat from the hot water tubes raises the temperature within the vessel significantly above the boiling point of the moisture at that pressure. Accordingly, as material enters the processing vessel, it immediately encounters an atmosphere wherein moisture within the material cannot exist in liquid form and is flash vaporized. The liberated vapor and some moisture becomes entrained within the air within the vessel. The material thus is dried.

The flashed vapor, moisture, and hot air mixture is continuously drawn out of the inner vessel through outlets 185 and delivered to the upper flash generator 145 (FIG. 16) through vacuum conduits 144 (also FIG. 16). Thus, the upper flash generator functions not to dry material moving through it, but rather to remove or evacuate liberated vapor from the inner vessel 177 and deliver it to the cyclone separator 148 to be exhausted for discard, re-condensed, or subjected to further processing. The upper flash generator may thus be though of as continuously digesting the vapor or moisture liberated from material within the inner vessel 177.

As mentioned above, the inner vessel is jacketed with circulating hot water moving through hot water tubes 183 around the circumference. These tubes preferably also are jacketed and sealed and under partial vacuum to reduce heat loss from in and around the inner vessel through conduction and convection. In a vacuum, heat transfer and thus heat loss can only occur through radiation, which is relatively insignificant in the vessel of FIG. 18. Accordingly, heat retention is maximized and heat loss minimized, which can result in shorter dwell or resonance times for material being dried within the inner vessel.

As mentioned, conditions within the processing vessel can be dynamically and precisely controlled by monitoring and controlling various aspects of the apparatus. One system for accomplishing this monitoring and control is illustrated in FIG. 17. The entire system can be monitored and controlled with an appropriately programmed control device such as a computer or a PLC 155. The PLC receives information from a wide variety of sensors within the system that indicate the current conditions within the system. These may include, for example, ambient conditions 168 such as temperature, pressure, barometric pressure, and humidity. Also sensed and provided to the PLC are the dynamic air conditions 167 of the positive displacement blowers including temperature, pressure, generated capacity, and humidity. Conditions 163 within the positive air pressure lines including feed capacity and temperature as well as conditions 166 within the vacuum lines (feed capacity, temperature, and humidity) also are sensed and conveyed to the PLC. Conditions 164 within the vacuum throttles as well as conditions 162 within the processing vessel, conditions 161 within the hopper, conditions within the flash generators, and conditions 169 within the cyclone separator also preferably are sensed and provided to the PLC, all in real time. The PLC thus "knows" at all times a variety of conditions that affect the drying of material within the system.

On the control side, the PLC is coupled through Variable Frequency Drives (VFDs) to various components of the system that can be controlled. For instance, the electric motors of the positive displacement blowers can be controlled through VFDs 156 and 157, the cyclone separator motor can be controlled through VFD 158, the outlet screw feed speed motor can be controlled through VFD 159. This example is not limiting and other aspects of the system can be dynamically controlled by the PLC through various appropriate control mechanisms, all in real time and dynamically. With such a control system, appropriately programmed, optimal drying conditions within the processing vessel (pressure, temperature, residence time, air flow rate, etc.) can be pre-established for a particular material to be dried. Such conditions will depend on many factors such as the type and coarseness of material being dried, the moisture content within the materials, ambient conditions, and others. The PLC is programmed to maintain these conditions within the processing vessel by varying operational parameters of the system dynamically to obtain the desired level of drying while material is resident within the processing vessel. The PLC can monitor weight into the processing vessel and weight out of the processing vessel to determine the amount of moisture removed, then make any applicable adjustments for more or less drying, all dynamically.

When the material within the processing vessel has reached a desired level of drying, it is conveyed from the processing vessel through outlet 143 (FIG. 16) to the lower flash generator 145. Here, it enters the discharge region where optimal conditions are established and maintained by the vacuum throttle as described above. This produces one last flash drying of the material before it is exhausted through exhaust line 146 to the cyclone separator 148, where the now dried material migrates to the bottom of the separator and the liberated moisture and vapor from the processing vessel and the flash generator is exhausted for discard or further processing.

Figure 19:
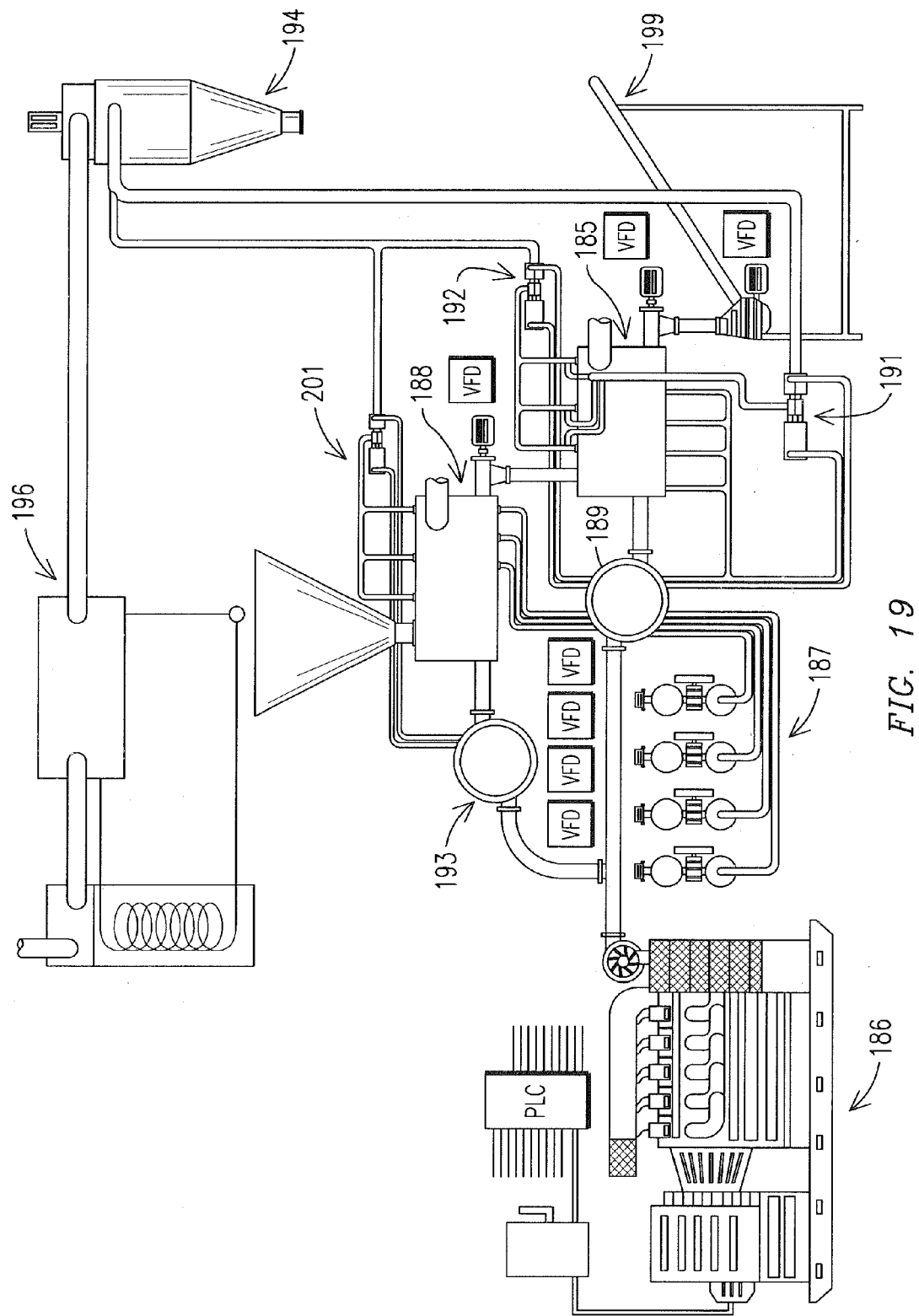
FIG. 19 is a schematic view of yet another embodiment of a system for drying materials contained within a processing vessel.

FIG. 19 illustrates a possible system that integrates various principles and devices described above into yet another configuration for drying materials that includes two processing vessels 188 and 191 in series with one another. Here, an electrical generator 186 is driven by an internal combustion engine, which may operate on natural gas, diesel, or may be a turbine or similar engine. During operation to produce electricity for operating electric motors of the system, the engine produces exhaust that is delivered to heat exchangers 189 and 193. The heat exchangers harvest the heat of the engine exhaust and may transfer this heat to the hot air stream provided to the processing vessels by the blower or blowers. These processing vessels may operate as described above to dry materials delivered to them, except that processing vessel 185 receives pre-dried material directly from processing vessel 188.

From the processing vessel 185, material is delivered by an auger or other conveying device to a conveyor belt that carries the dried material to a remote location for use or further processing. Moist air and vapor from the processing vessels are digested by flash generators 192 and 201 and delivered to a cyclone separator 194, and/or a scrubber, which separates the moisture and vapor from any entrained material. From the cyclone separator, the moist air and vapor is delivered to a condensing unit 196, which condenses moisture and vapor back to a liquid state for re-use. Such a system might, for instance, be used for desalination of seawater where dried salts and minerals are carried away on the conveyor belt 199 and potable water is collected in the condensing unit or pumped to a remote location for storage.

Figure 20:
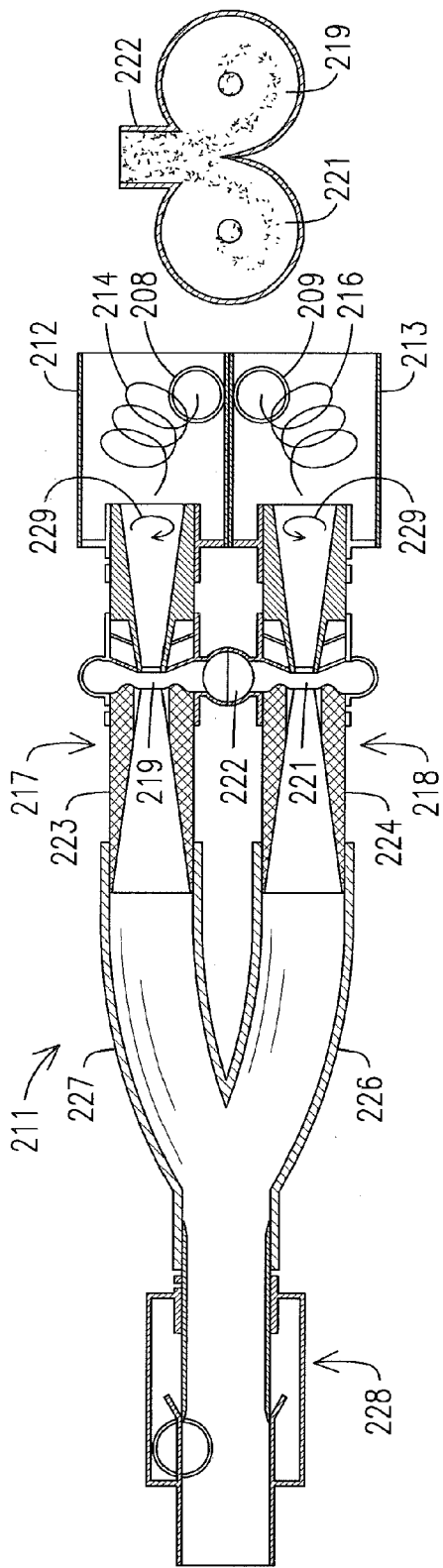
FIG. 20 illustrates an alternate embodiment of an in-line material drying system having two flash generators with vacuum throttles feeding a single nested venturi flash generator.

FIG. 20 illustrates an alternate embodiment of an in-line material drying system employing principals of the invention. The embodiment of FIG. 20 comprises a pair of flash generators 217 and 218, each having a discharge region 219 wherein a pressure drop is established as described above. Each flash generator is fed by a respective plenum 212 and 213 that are supplied with air flows from blowers (not shown) through inlets 208 and 209. The inlets are oriented to introduce air tangentially into the plenum chambers to create rotating flows or vortices 214 and 216 within the plenum chambers. It is preferred that these vortices be counter rotating as shown at 229 in FIG. 20.

The counter rotating flows 214 and 216 move through the progressively narrowing inlets of their respective flash generators, where the velocities of the flows increase dramatically. The flows then move through a choke point orifice and into respective discharge regions 219 and 221 of the flash generators. A single inlet port 222 communicates with the discharge regions, which are coupled together between the flash generators. It is possible to use one inlet for material to be dried because the rotation of air within the two discharge regions is counter rotational, as perhaps better illustrated on the far right in FIG. 20. A target substance in the material is thus flash evaporated within the discharge regions as detailed above. The flow, which contains solids and vaporized substance, then moves through exhausts 223 and 224 and into respective legs 226 and 227 of a Y-shaped merging conduit. Further downstream, the two streams are merged together and passed through a flash generator 228 having a nested venturi configuration as described in the incorporated patent application. The material is further dried as it passes through this flash generator, and then may be delivered to, for instance, a cyclone separator for separating the vaporized and liberated substance from solids of the material.

Figure 21:
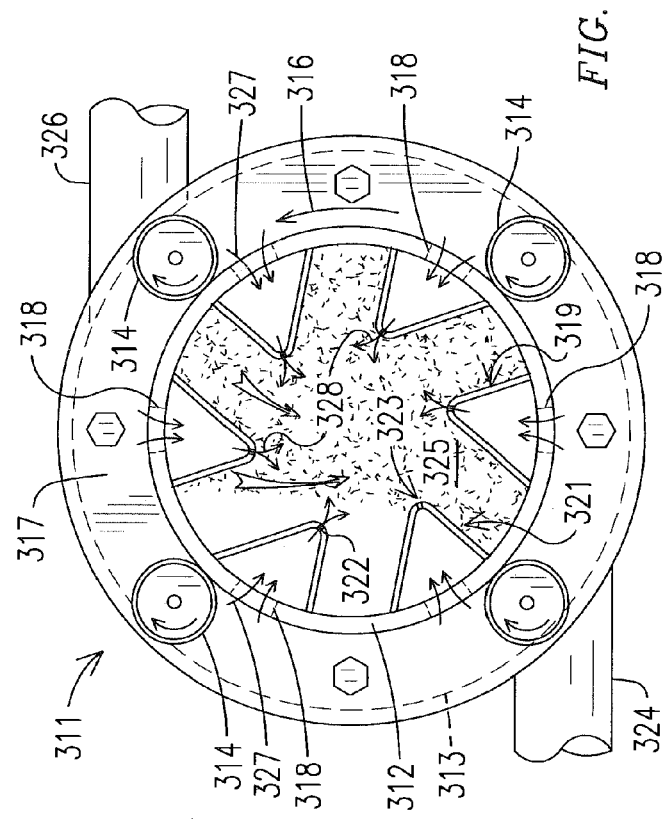
FIG. 21 illustrates one possible embodiment of a processing vessel and its internal vane structure for agitating and aerating material within the vessel.

FIG. 21 shows an end schematic view of an alternate embodiment of a processing vessel according to the invention. The processing vessel 311 is elongated and cylindrical in shape and comprises an inner vessel 312 rotatably mounted via rollers 314 within an outer vessel 313. The inner and outer vessels define an annular space 317 between the vessels and the inner vessel can be rotated within the outer vessel as indicated by arrow 316. A heated air inlet port 324 communicates with the space 317 and delivers heated air into the space from a remote positive displacement blower (not shown) or other source. A heated air exhaust 326 communicates with the space 317 and delivers heated air from within the space 317 to a remote flash generator for operation of the flash generator as described above. It will thus be understood that, during operation, a continuous flow of heated air at greater than atmospheric pressure circulates through the space 317 before being directed to the plenum chamber of a flash generator of the system. The annular space 317 may further contain heating coils and/or heated liquid conduits to provide additional heat within the annular space. Alternatively, a heated liquid instead of heated air may be contained within the space for certain applications. In some cases, it may be desirable to establish a sub-atmospheric pressure environment within the annular space 317. These and other alternatives are intended to fall within the scope of the invention.

The inner vessel is provided with arrays of inlet ports 318 that communicate with the annular space 317. An array of inwardly projecting vanes or flutes is arranged around the interior of the inner vessel 312 and the array may comprise longer flutes 321 and shorter flutes 319. The flutes in this embodiment are defined by two walls arranged at an angle with respect to each other to define a hollow triangular shape. Of course, other shapes are possible and within the scope of the invention. The base of the triangle extends along the length of the inner vessel 312 such that the interior of at least some of the hollow triangular flutes overlies an array of inlet ports 318. The apexes of the triangular flutes are provided with longitudinally extending exhaust slits 322 and 323 that also communicate with the interior of their respective hollow flutes, which can be controlled or manipulated with sliding magnetic valves 320. During operation, heated pressurized air within the annular space 317 passes through the inlet ports 318 and into the interiors of the hollow flutes 319 and 321. In turn, the heated air is expelled from the hollow flutes and into the interior of the inner vessel 312 through the longitudinal slits 322 and 323 extending along the apexes of the flutes.

The atmosphere (vacuum level and temperature) within the inner vessel 312 is established and controlled as detailed above in such a way that water (or another target substance) cannot exist in liquid form within the inner vessel. Accordingly, water within the material 325 in the inner vessel is evaporated out of the material. To aid this process, the material 325 is continually agitated, tumbled, and aerated as the inner vessel rotates by being lifted up on the flutes and then dropped back down as the flutes round the upper portion of the inner vessel, as illustrated by the large arrows in FIG. 21. At the same time, heated air permeates the material through the longitudinally extending exhaust slits 322 and 323 along the apexes of the flutes. In this way, the surface area of particles in the material exposed to heated air within the sub-atmospheric conditions in the inner vessel is maximized to enhance flash evaporation of water within the material. The liberated water vapor and moisture is continuously drawn out of the inner vessel by a remote flash generator so that the material 325 within the chamber continues to dry until it reaches a desired moisture content. At this point, it may exit the inner vessel for further drying, collection, or other treatment.

Figure 22:
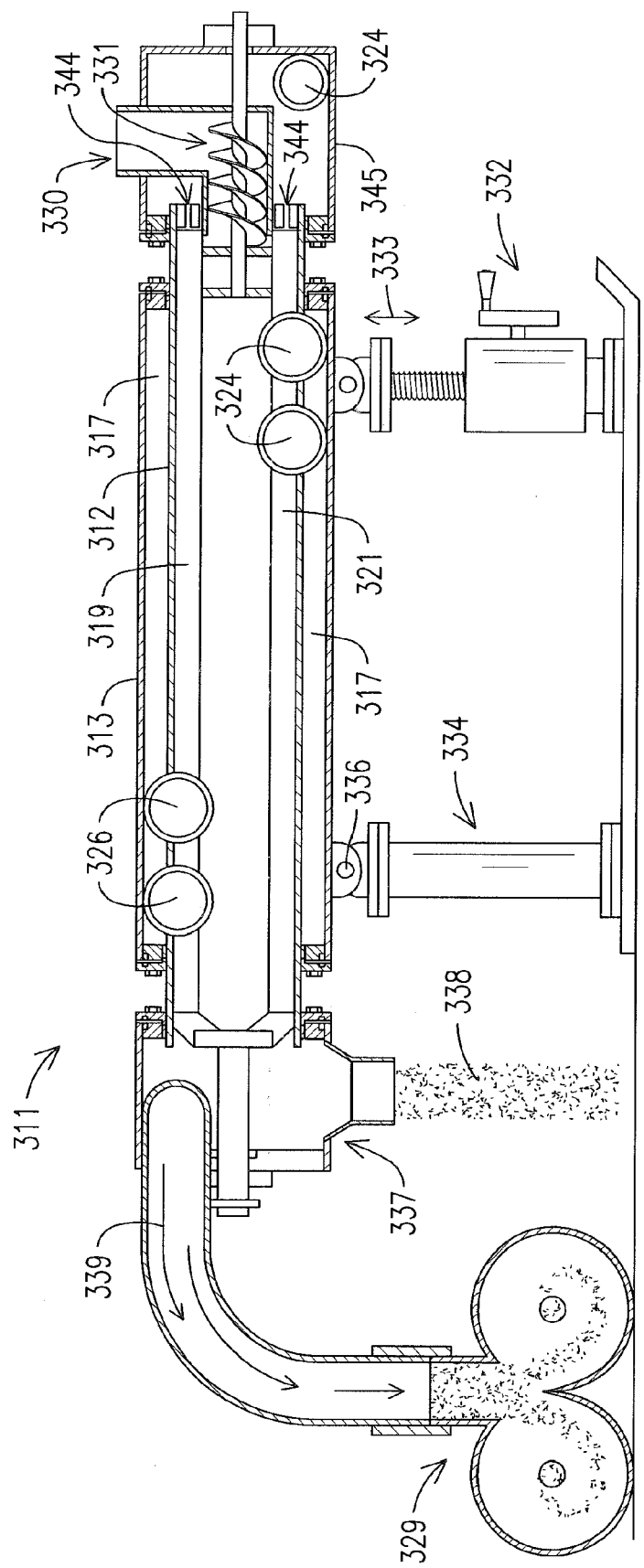
FIG. 22 is a side schematic view of a processing vessel dryer according to one embodiment of the invention.
Figure 23:
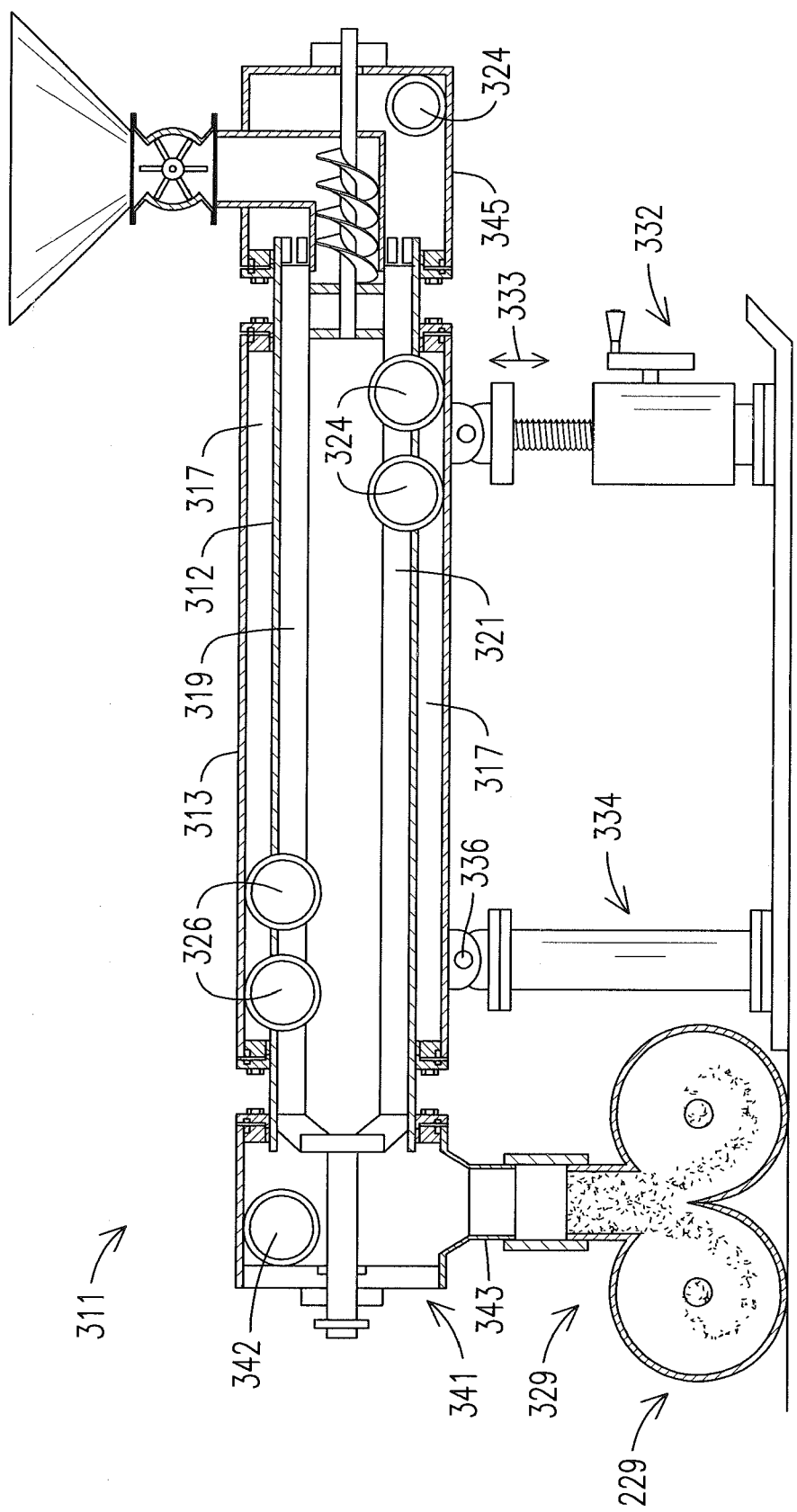
FIG. 23 is a side schematic view of a processing vessel dryer according to an alternate embodiment of the invention.

FIGS. 22 and 23 illustrate two alternate embodiments of a non-thermal drying system that incorporate the processing vessel of FIG. 21. FIG. 23 shows that the non-thermal drying system comprises a processing vessel 311 having an inner vessel 312 rotatably mounted within outer vessel 213 defining annular space 317 therebetween. The inner vessel has flutes 319 as described above with longitudinally extending heated air slits along their apexes. Heated air inlet ports 324 deliver heated air from a remote blower into the annular space 312 and heated air exhaust ports 326 delivers heated air from within the space 312 to a flash generator, which may be flash generator 329, for operation of the flash generator. The processing vessel 311 is supported at its downstream end on a support pillar 334 by means of a pivot joint 336. The upstream end of the processing vessel 311 is likewise pivotally supported on a jack stand 332. The jack stand 332 can be raised and lowered to establish a desired downstream slope of the processing vessel. This causes material within the vessel to move progressively from its upstream end to its downstream end at a rate that is a function of the slope established by the jack stand 332.

A material inlet 330 is configured to receive material to be dried within the processing vessel. The material preferably is delivered through an air lock (not shown) from a hopper or other storage source. Material introduced into the material inlet 330 encounters an auger, which conveys the material at a predetermined rate in the downstream direction and into the upstream end of the inner vessel 312 of the processing vessel. The discharge region of flash generator 329 communicates with the inner vessel 312 through separator 337. As described in detail above, the flash generator 329, which in this drawing is a dual flash generator as shown in FIG. 20, establishes the vacuum conditions within the inner vessel 312, which preferably are controllable through adjustment of the vacuum throttles of the flash generator 329. Further, in this embodiment, the flash generator serves as a digester by continuously removing flashed vapor and moisture from within the processing vessel to allow for continued drying of material within the vessel.

In operation, vacuum conditions within the inner vessel are established by the flash generator based upon the type of material to be dried and the target substance to be removed from the material. Heated air (or other sources of heat) is delivered to the annular space between the inner and outer vessels through heated air inlet ports 324 and is exhausted from the space through exhaust ports 326. Additional heated air may be supplied through inlet ports 344 if desired by supplying the plenum 345 from a source of heated air. Thus, a supply of pressurized (relative to atmospheric pressure) heated air is constantly present in the space 317 between the vessels. This heated air is drawn through the ports 318 (FIG. 21) and enters the hollow interiors of the triangular flutes 319 and 321 and is ejected into the inner vessel through the longitudinal slits 322 and 323 in the flutes. This heated air in conjunction with the vacuum conditions established within the inner vessel creates an environment within which water (or another targeted substance) cannot exist in liquid form. Water within the material thus begins to flash evaporate from the material. Rotation of the inner vessel agitates and aerates the material to make the evaporative process and thus the drying as efficient as possible.

The processing vessel is tilted by the jack stand 332 so that it slopes in the downstream direction at a predetermined angle. As the material is agitated, aerated, and dried within the inner vessel, this slope causes the material to move progressively toward the downstream end of the processing vessel. The slope of the processing vessel is selected so that the dwell time of the material in the inner vessel will be sufficient for the material to be dried to a desired moisture content when it reaches the downstream end of the processing vessel. Here, the now dried material enters the separator 337, where the solids 338 fall to a collection area, preferably through an air lock (not shown). The vapor and moisture liberated from the material is drawn away and digested by flash generator 329.

With the just described embodiment, virtually any material can be dried with high precision because the precise vacuum conditions and temperature can be established and maintained within the processing vessel and the dwell time during which the material is subject to these conditions can be as short or as long as necessary to obtain the desired level of drying.

FIG. 23 illustrates a non-thermal dryer similar to that shown in FIG. 22. The processing vessel and feed mechanism is substantially the same, and will not be described in detail again here. In this embodiment, however, dried material leaves the exit end of the processing vessel and moves into a separator 341. Liberated moisture and vapor is removed through separator outlet 342 while the solids within the material are themselves delivered to the discharge regions of flash generators 229. From here, the solids become entrained in the rotating air flow at very high vacuum levels within the flash generator and are further flash dried as described in detail above. Thus, FIG. 23 represents a two stage non-thermal drying system with the first drying stage proceeding in the processing vessel and the second occurring in the flash generator.

Additional aspects that may be incorporated into a system that embodies the present invention may include the following, which are examples only and not limiting.

Incorporation of multiple processing vessels with a control system that maintains different or similar conditions within each of the serial or independent processing vessels preset or adjusted for any desired inner vessel environmental variable.

Multiple flash generators of varying or different configurations establishing conditions with a single processing vessel.

Blending ports through the processing vessel providing the ability to mix different materials and/or catalysts into the processing vessel to improve drying results, catalyze a desired chemical reaction, form a compound from the dried material, or otherwise affect the material or process.

Use of heat exchangers of various configurations and fed by various heat sources to provide supplemental heat to sub-atmospheric air generated by positive displacement blowers.

Mixing devices for mixing materials prior to or during residency in processing vessels.

Vacuum boosters possibly used in conjunction as an air lock.

Generating pulsing vacuum conditions within flash generators and/or processing vessels to optimize drying.

Materials such as tempered glass used as a thermal magnifier or condenser to improve efficiencies.

Scrubbers in addition to or in conjunction with cyclone separators for cleaning exhaust gases.

Scrubbers used as a vacuum throttle.

PLC control and sensors other than those described above.

Drying of a wide variety of materials to remove any substance with appropriate vapor pressures such as removing oil from oil sands and oil shale, removing water and/or combustible liquids from coal fines, the drying of rice, drying of pharmaceuticals, drying mash in pet food and other manufacturing processes, etc. Thus the invention is not limited to removing water from substances, but can be used to remove any volatile substance from a material where the substance has an appropriate vapor pressure within the limits of the system.

The invention has been described herein in terms of preferred embodiments, preferred applications, and preferred methodologies considered by the inventor to represent the best modes of carrying out the invention. It will be understood by the skilled artisan; however, that a wide range of additions, deletions, and modifications, both subtle and gross, may be made to the illustrated and exemplary embodiments. For example, while illustrated in a system for drying a stream of material, the vacuum throttle concept disclosed herein for controlling a vacuum may have applications in other areas and in other devices such as, for example, scrubbers, product conveyors, and any current air or liquid ejector, and/or educator currently known or to be known. These and many other features and aspects might well be added and/or modified by the skilled artisan without departing from the spirit and scope of the invention embodied in the illustrated examples above and the claims.

What is claimed is:

1. A system for drying a material by liberating a substance having a vapor pressure from solids in the material, the system comprising a flash generator that includes:
   a plenum chamber;
   a blower providing a stream of air to the plenum chamber;
   an outlet communicating with the plenum chamber;
   a velocity accelerator disposed downstream of the outlet and arranged to receive air from the outlet of the plenum chamber, the velocity accelerator defining a progressively narrowing interior passageway terminating at a downstream choke point orifice;
   the choke point orifice discharging into a discharge region having a volume larger than the volume of the choke point orifice;
   an adjustable throttle body disposed in the discharge region and being selectively movable toward and away from the choke point orifice to decrease or increase the volume of the discharge region and thereby vary a pressure within the discharge region during operation of the system as needed for drying a material;
   a passageway formed through the throttle body for receiving material from the discharge region and conveying the material in a downstream direction and;
   one or more actuators coupled to the throttle body and configured to move the throttle body toward and/or away from the choke point in response to adjustment signals to adjust the volume of the discharge region.

2. The system of claim 1 wherein the blower introduces air into the plenum chamber substantially tangentially to generate a vortex in the stream of air.

3. The system of claim 1 further comprising a controller programmed to generate adjustment signals and convey the adjustment signals in such a way that the actuators are caused to move.

4. The system of claim 3 further comprising at least one sensor positioned to sense one or more conditions within the system and convey the sensed conditions to the controller, the controller being programmed to generate adjustment signals responsive to the sensed conditions.

5. The system of claim 4 wherein the sensor senses one or more of ambient temperature, ambient pressure, ambient barometric pressure, ambient humidity, blower temperature, blower pressure, blower generated capacity, blower humidity, positive air pressure feed capacity, positive air pressure temperature, vacuum line feed capacity, vacuum line temperature, vacuum line humidity, conditions within the discharge regions, conditions within a feed hopper, conditions within flash generators, and conditions within a cyclone separator.

6. The system of claim 1 further comprising an inlet port communicating with the discharge region for introduction of material to be dried into the discharge region.

7. The system of claim 1 wherein the choke point orifice is defined by surrounding walls and the discharge region is at least partially defined by surrounding walls, and further comprising means for changing the configurations of the surrounding walls.

8. The system of claim 7 wherein the means for changing the configurations of the surrounding walls comprise bladders.

9. The system of claim 8 wherein the bladders can be inflated or deflated to change the configurations of the surrounding walls.

10. The system of claim 1 further comprising a spray nozzle arranged and configured to spray viscous materials into the discharge region to be dried.

11. The system of claim 1 further comprising a hopper for containing more viscous material and a conveyor mechanism for conveying more viscous material into the discharge region to be dried.

12. The system of claim 1 further comprising a processing vessel for containing material to be dried and a vacuum line communicating between the processing vessel and the discharge region of the flash generator whereby atmospheric conditions within the processing vessel can be established and controlled by adjusting the throttle body of the flash generator to change the volume of the discharge region.

13. The system of claim 12 wherein material is dried within the processing vessel before being introduced from the processing vessel into the discharge region of the flash generator.

14. The system of claim 12 further comprising means for agitating material within the processing vessel to promote drying within the vessel.

15. The system of claim 14 wherein the processing vessel is rotatable and wherein the means for agitating comprises agitation flutes within the processing vessel configured to lift and drop the material as it is dried.

16. The system of claim 12 wherein the processing vessel comprises an inner vessel for containing material surrounded by an outer vessel that defines a space between the inner vessel and the outer vessel.

17. The system of claim 16 further comprising heated media tubes circulating through the space and configured to carry a heated media to provide heat to material in the inner vessel.

18. The system of claim 17 wherein the heated media comprises water.

19. The system of claim 12 further comprising conduits communicating between the blower and the processing vessel to deliver heated air from the blower to the processing vessel.

20. The system of claim 12 further comprising a second flash generator and a vacuum line communicating between the processing vessel and the discharge region of the second flash generator, the second flash generator removing liberated moisture and vapor from the processing vessel as material is dried in the processing vessel.

* * * * *